(12) United States Patent
Uo

(10) Patent No.: US 11,451,254 B2
(45) Date of Patent: Sep. 20, 2022

(54) COMMUNICATION DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Toyoaki Uo, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/361,207

(22) Filed: Jun. 28, 2021

(65) Prior Publication Data
US 2022/0014218 A1    Jan. 13, 2022

(30) Foreign Application Priority Data

Jul. 9, 2020 (JP) .............................. JP2020-118437

(51) Int. Cl.
| | | |
|---|---|---|
| *H02J 3/38* | (2006.01) | |
| *H04B 1/04* | (2006.01) | |
| *H04B 1/12* | (2006.01) | |
| *H04B 1/10* | (2006.01) | |
| *H04L 27/00* | (2006.01) | |
| *H04B 1/408* | (2015.01) | |

(52) U.S. Cl.
CPC .......... *H04B 1/0483* (2013.01); *H04B 1/109* (2013.01); *H04B 1/126* (2013.01); *H04B 1/408* (2013.01);
(Continued)

(58) Field of Classification Search
CPC ..... H04L 25/0266; H04L 12/10; H04L 67/12; H04L 25/0272; H04L 25/02; H04L 25/0268; H04L 2012/40215; H04L 25/0276; H02J 3/381; H02J 3/383; H02J 2300/24; H02J 2207/20; H02J 50/10;
(Continued)

(56) References Cited

U.S. PATENT DOCUMENTS 5,952,849 A  9/1999 Haigh
7,302,247 B2 11/2007 Dupuis
(Continued)

FOREIGN PATENT DOCUMENTS

JP  2015-149731 A  8/2015
JP     5861054 A  2/2016
(Continued)

*Primary Examiner* — Eva Y Puente
(74) *Attorney, Agent, or Firm* — Kim & Stewart LLP

(57) ABSTRACT

A communication device according to an embodiment includes an oscillator, a first signal generation circuit, a first insulation element, a first receiving circuit, and a first output circuit. The oscillator is configured to output a first carrier signal when at least one of a plurality of input signals that are externally input is at a first logic level. The first carrier signal and a first input signal among the input signals are input to the first signal generation circuit. The first signal generation circuit is configured to generate a first signal when the first input signal changes from a second logic level to the first logic level, output a first modulated signal based on the first signal, and thereafter output a second modulated signal based on the first carrier signal.

20 Claims, 25 Drawing Sheets

(52) U.S. Cl.
CPC ......... *H04L 27/0014* (2013.01); *H02J 3/381* (2013.01); *H04B 2001/0491* (2013.01); *H04L 2027/0016* (2013.01)

(58) Field of Classification Search
CPC ......... H02J 7/02; H02J 50/12; H02J 2310/48; H02J 7/0013; H05B 47/10; H05B 45/10; H05B 45/325; H05B 45/37
USPC .......................................................... 375/262
See application file for complete search history.

(56) References Cited

U.S. PATENT DOCUMENTS

| | | | |
|---|---|---|---|
| 7,376,212 B2 | 5/2008 | Dupuis | |
| 8,782,503 B2 | 7/2014 | Kaeriyama | |
| 9,362,963 B2 | 6/2016 | Nagai et al. | |
| 9,660,848 B2 | 5/2017 | Yun et al. | |
| 9,899,146 B2 | 2/2018 | Sugahara | |
| 10,193,717 B2 | 1/2019 | Yamagishi et al. | |
| 2014/0139962 A1* | 5/2014 | Voss | H02H 3/10 361/91.1 |
| 2014/0169038 A1* | 6/2014 | Kamath | H03D 3/00 363/16 |
| 2019/0280887 A1* | 9/2019 | Telefus | H02J 3/00 |
| 2019/0305775 A1* | 10/2019 | Parisi | H02M 3/33523 |
| 2020/0083932 A1 | 3/2020 | Uo et al. | |
| 2021/0126811 A1* | 4/2021 | Reichert | H03F 3/21 |

FOREIGN PATENT DOCUMENTS

| | | |
|---|---|---|
| JP | 2016-111374 A | 6/2016 |
| JP | 2018-160880 A | 10/2018 |
| JP | 2020-043432 A | 3/2020 |

\* cited by examiner

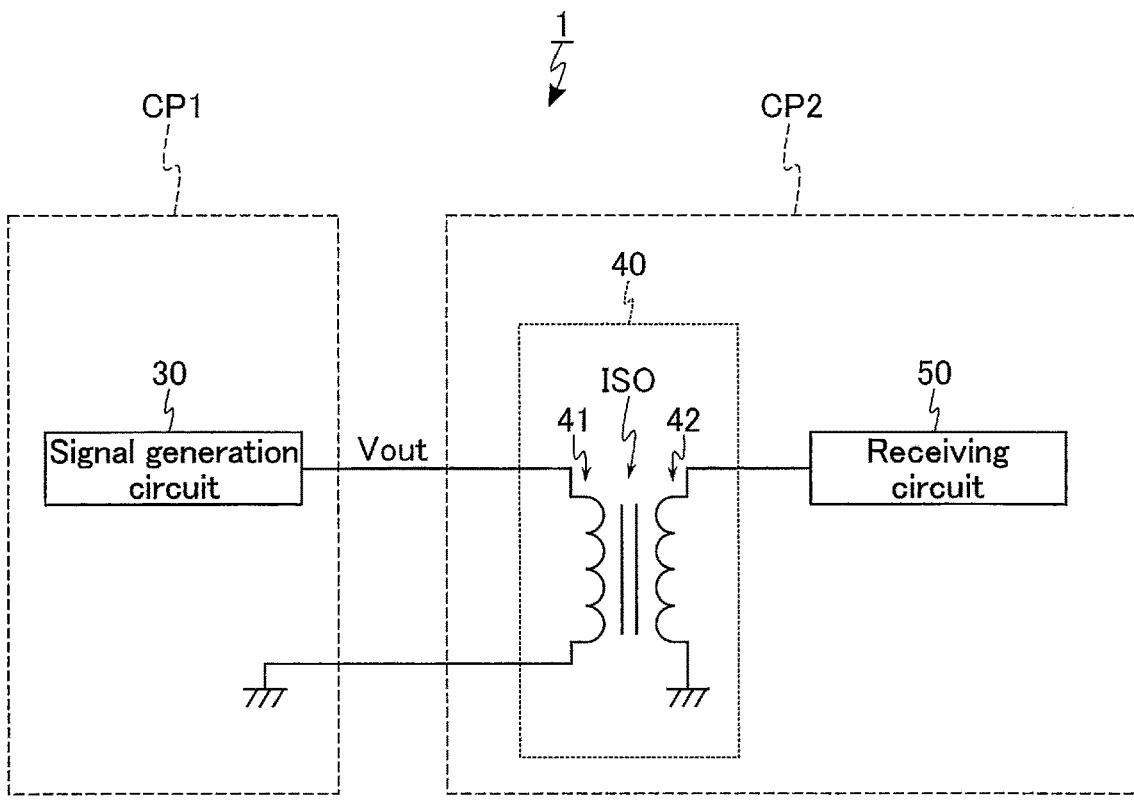
F I G. 4
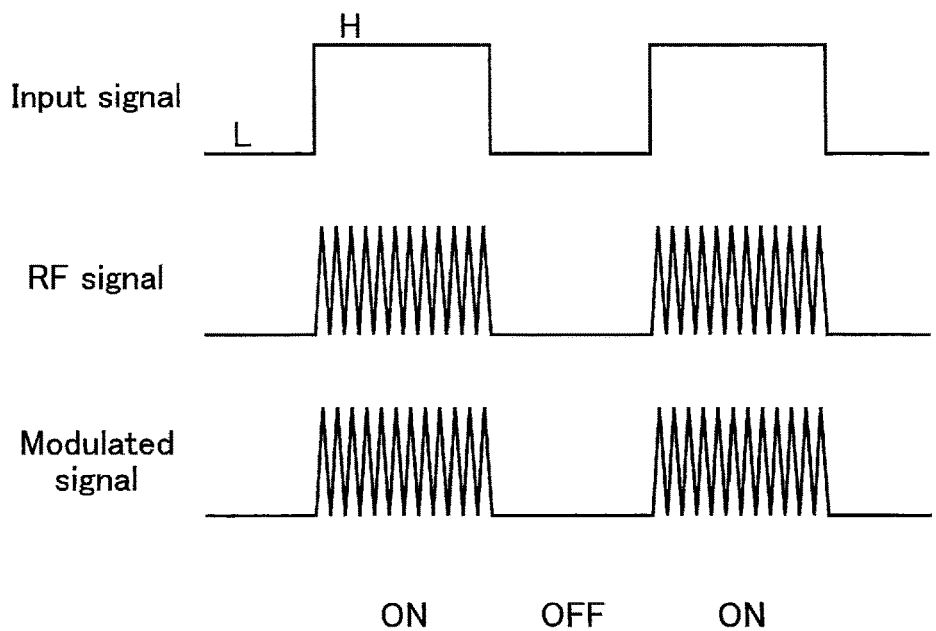
F I G. 5

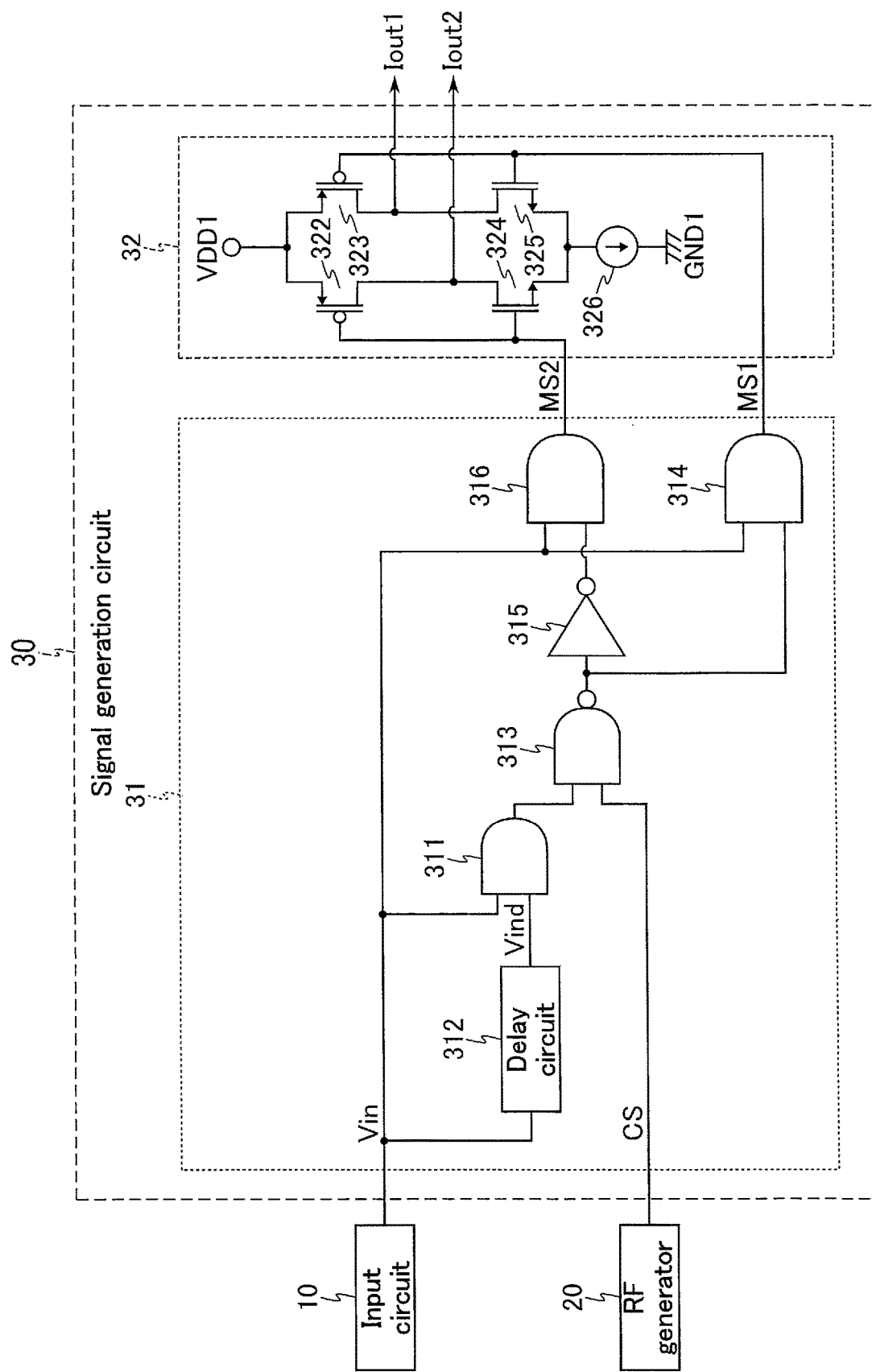
F I G. 11

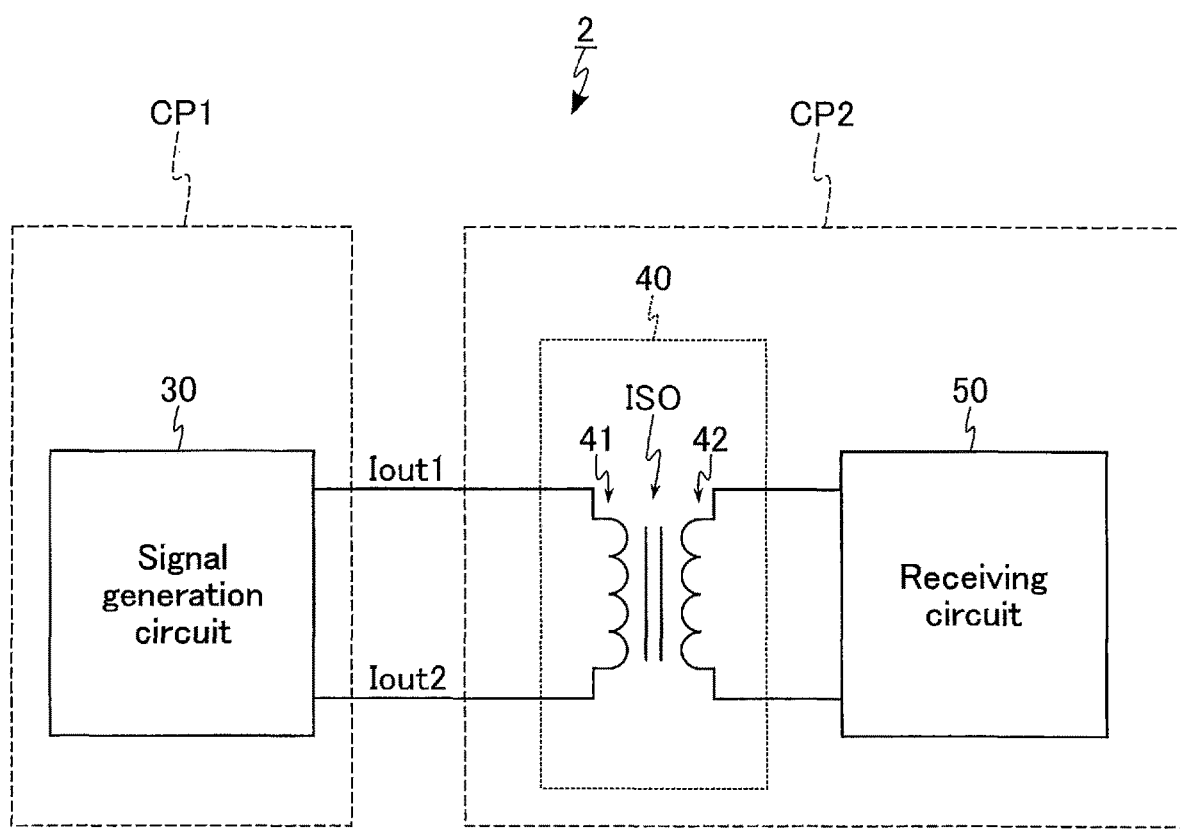
F I G. 12

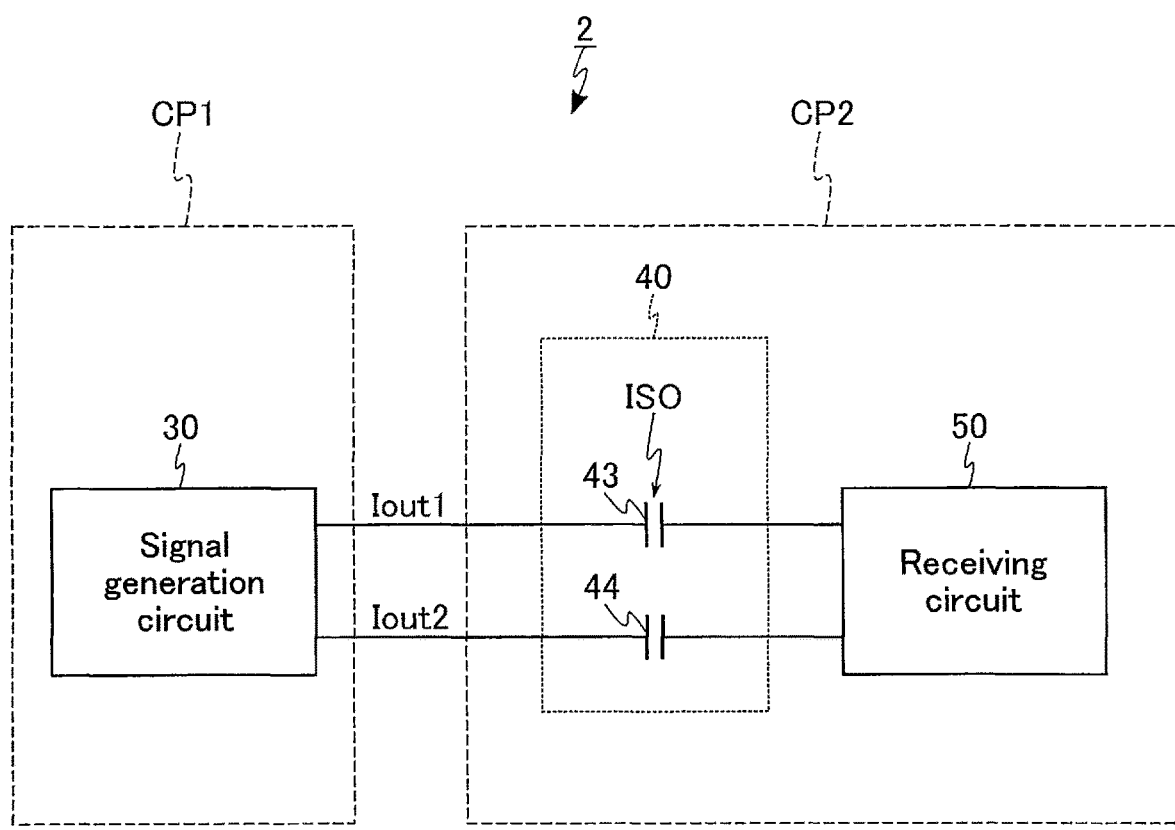
F I G. 14

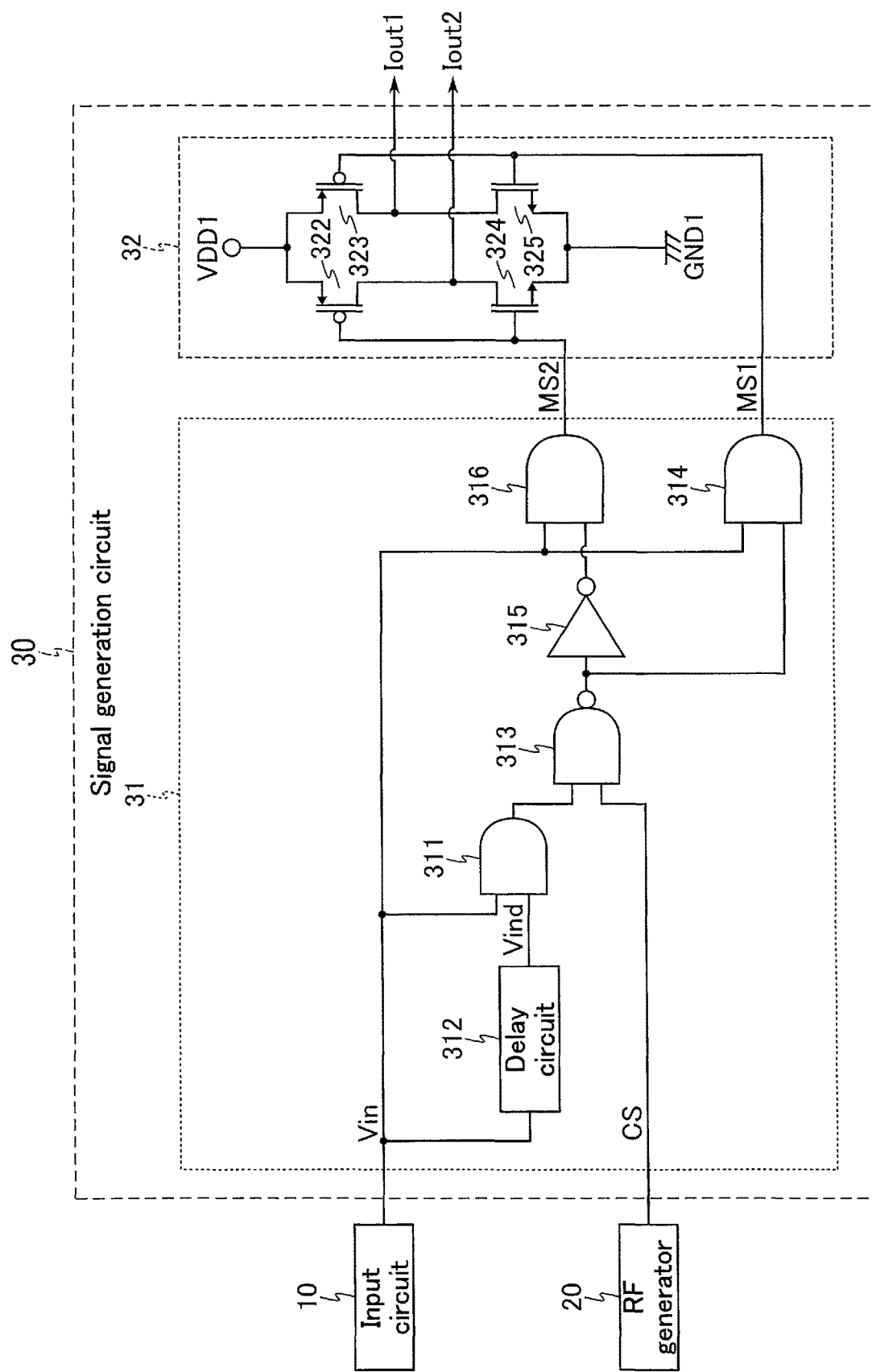
F I G. 15

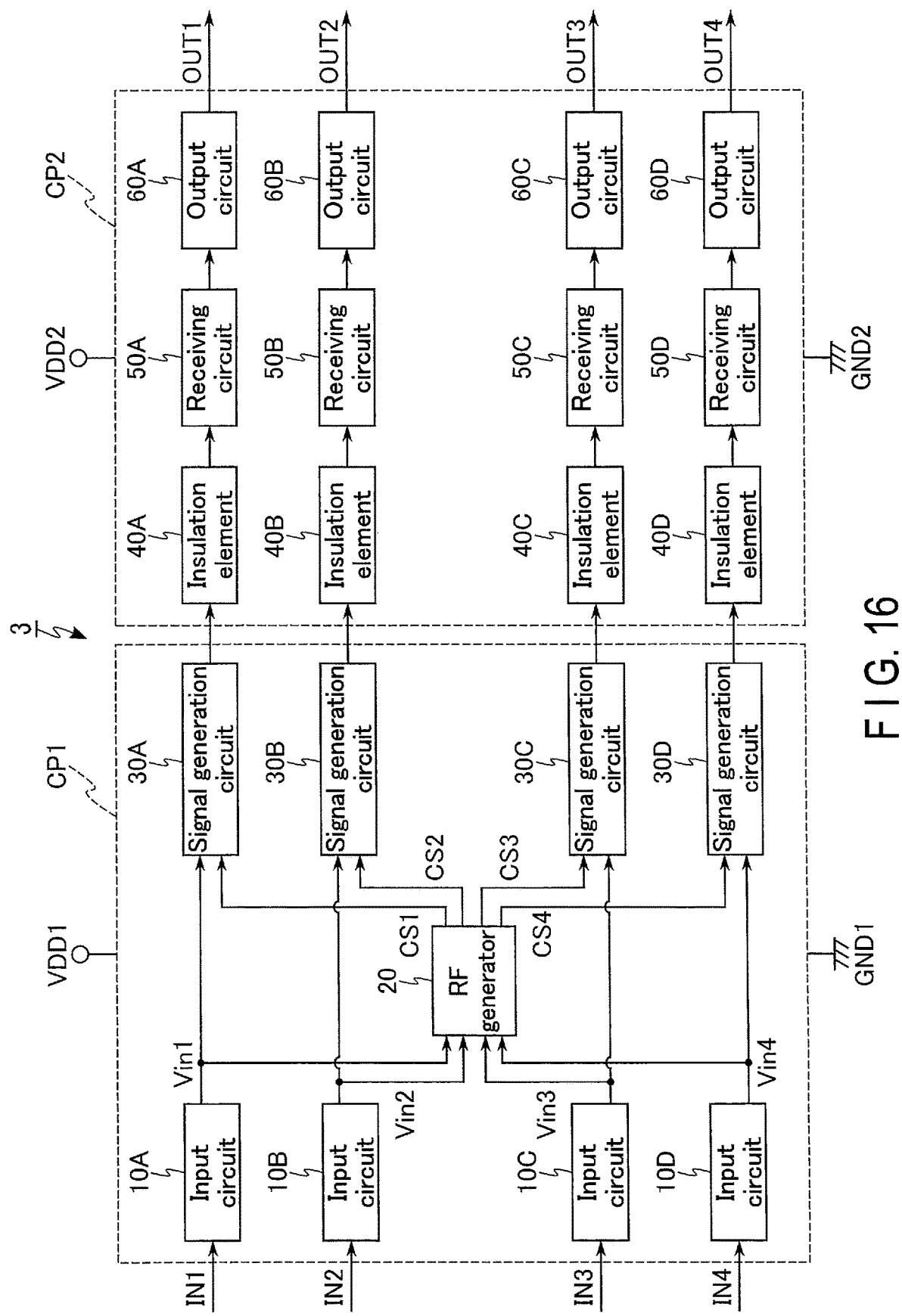
F I G. 16

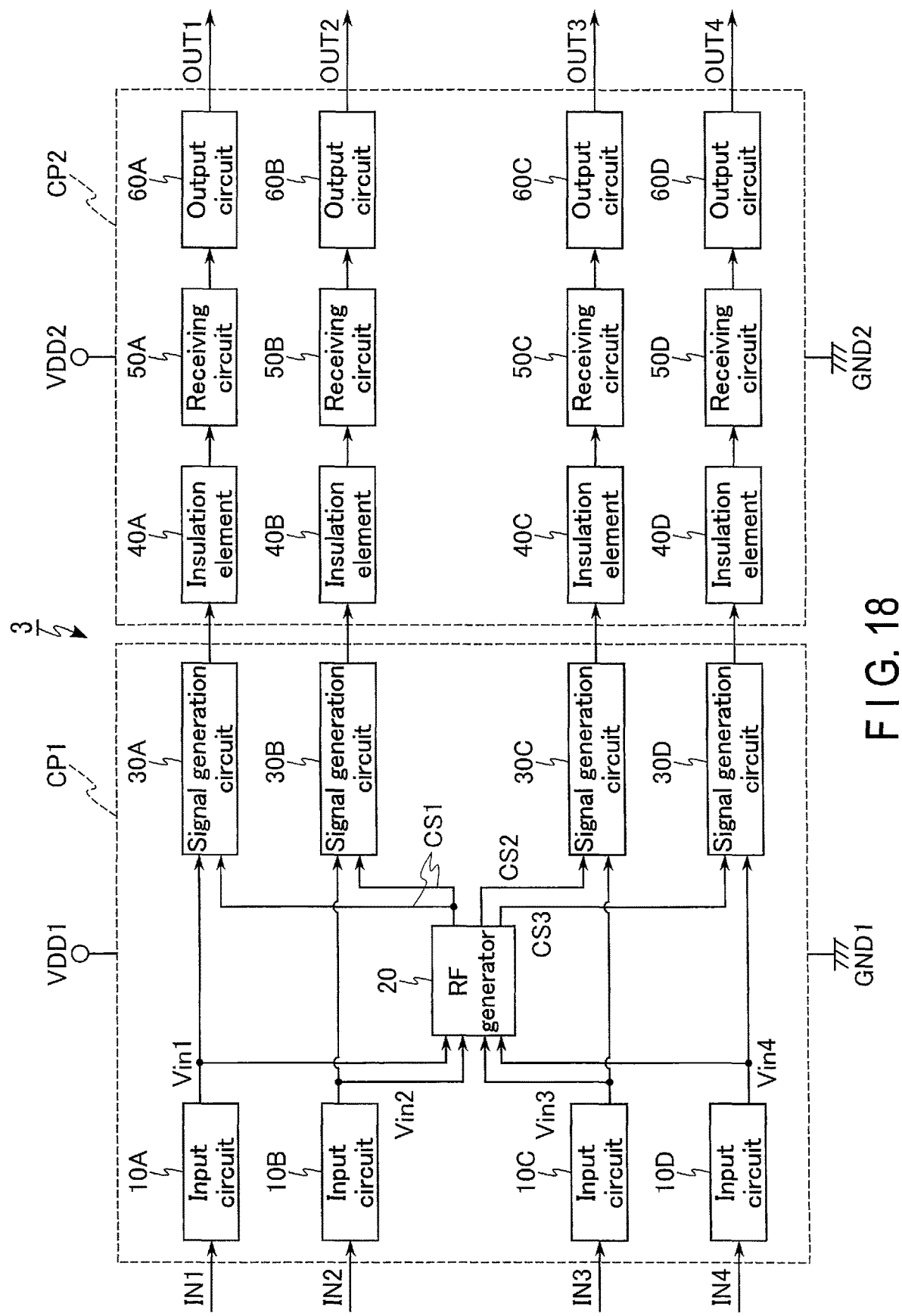
F I G. 18

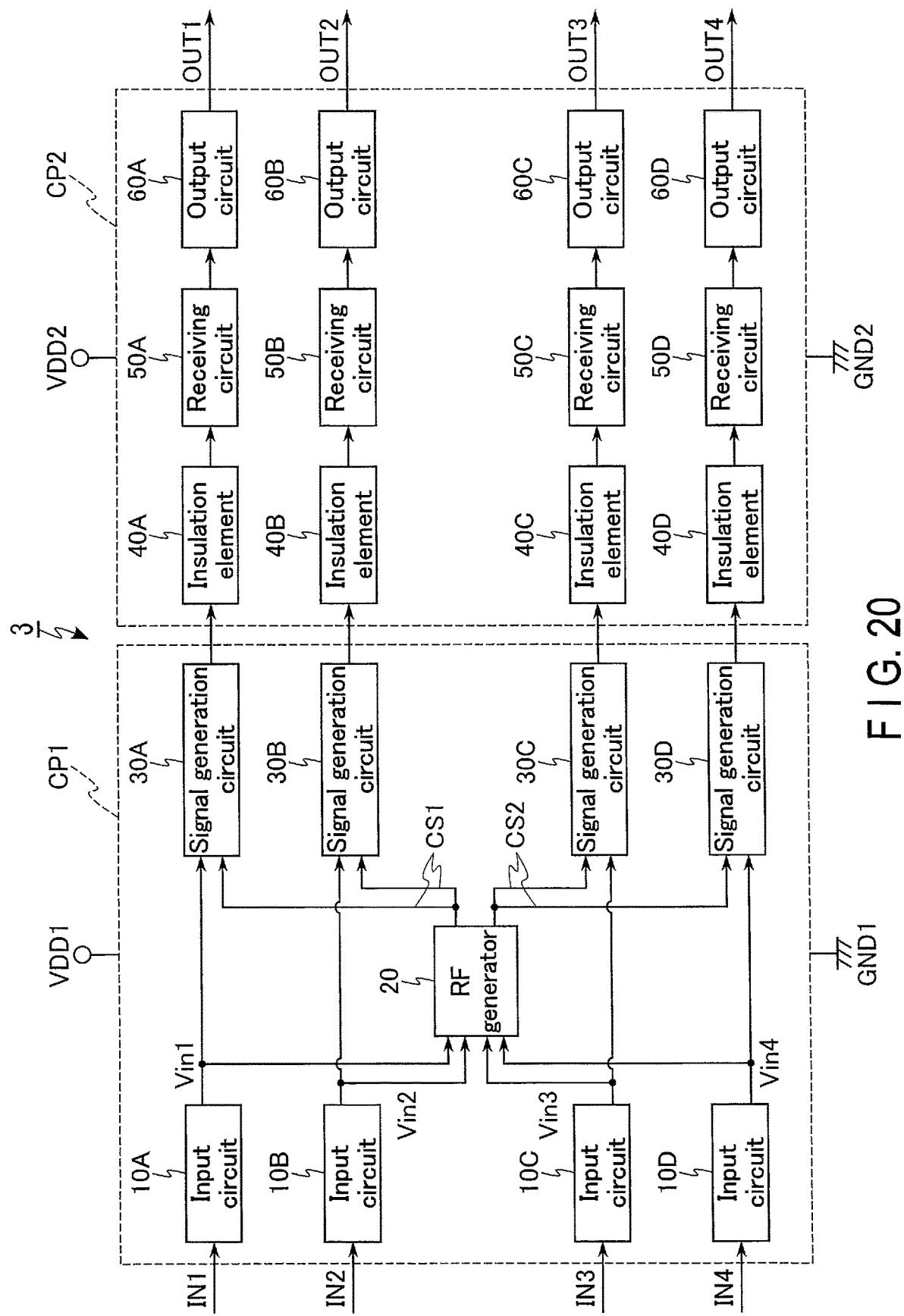
F I G. 20

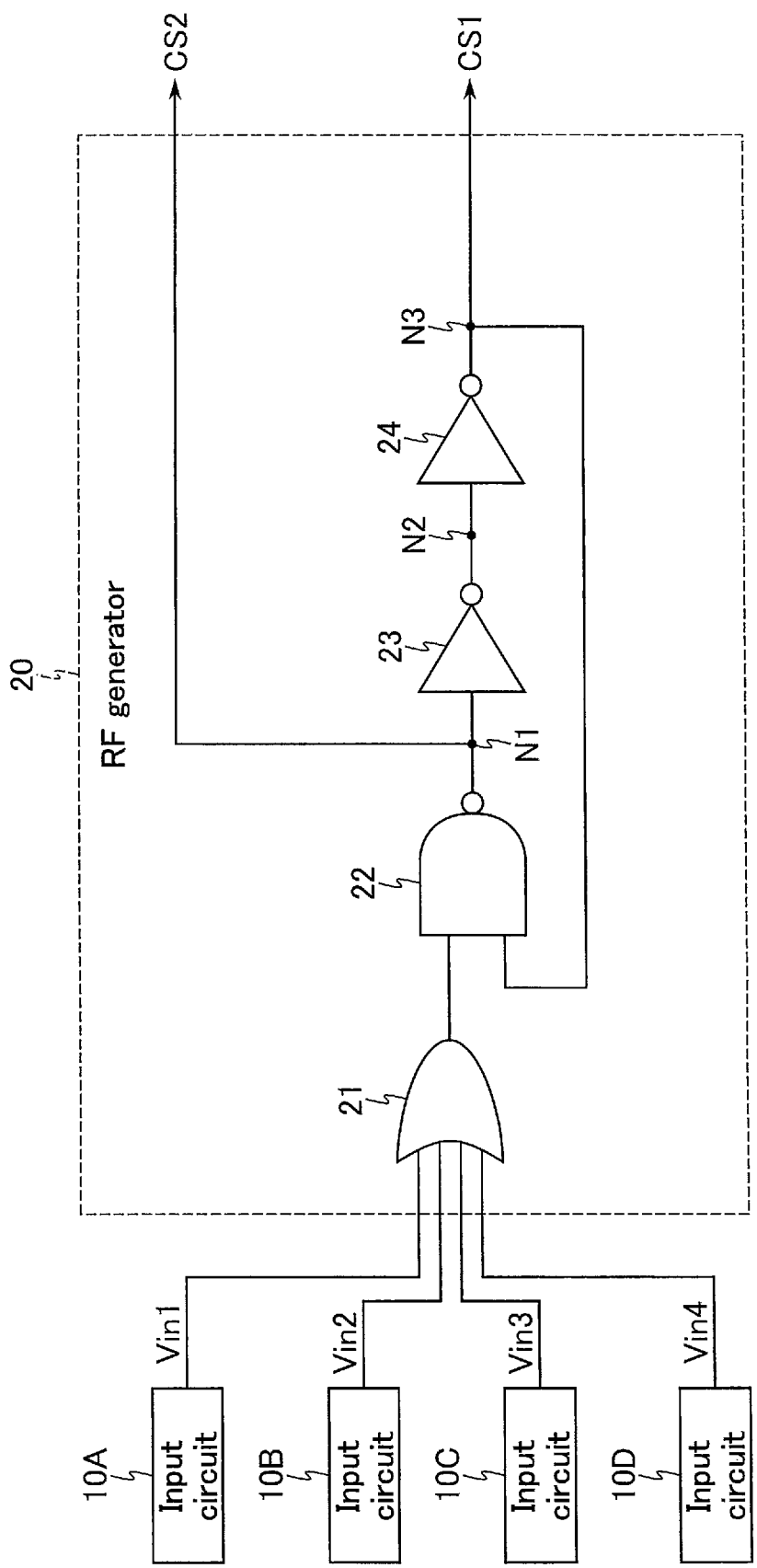
F I G. 21

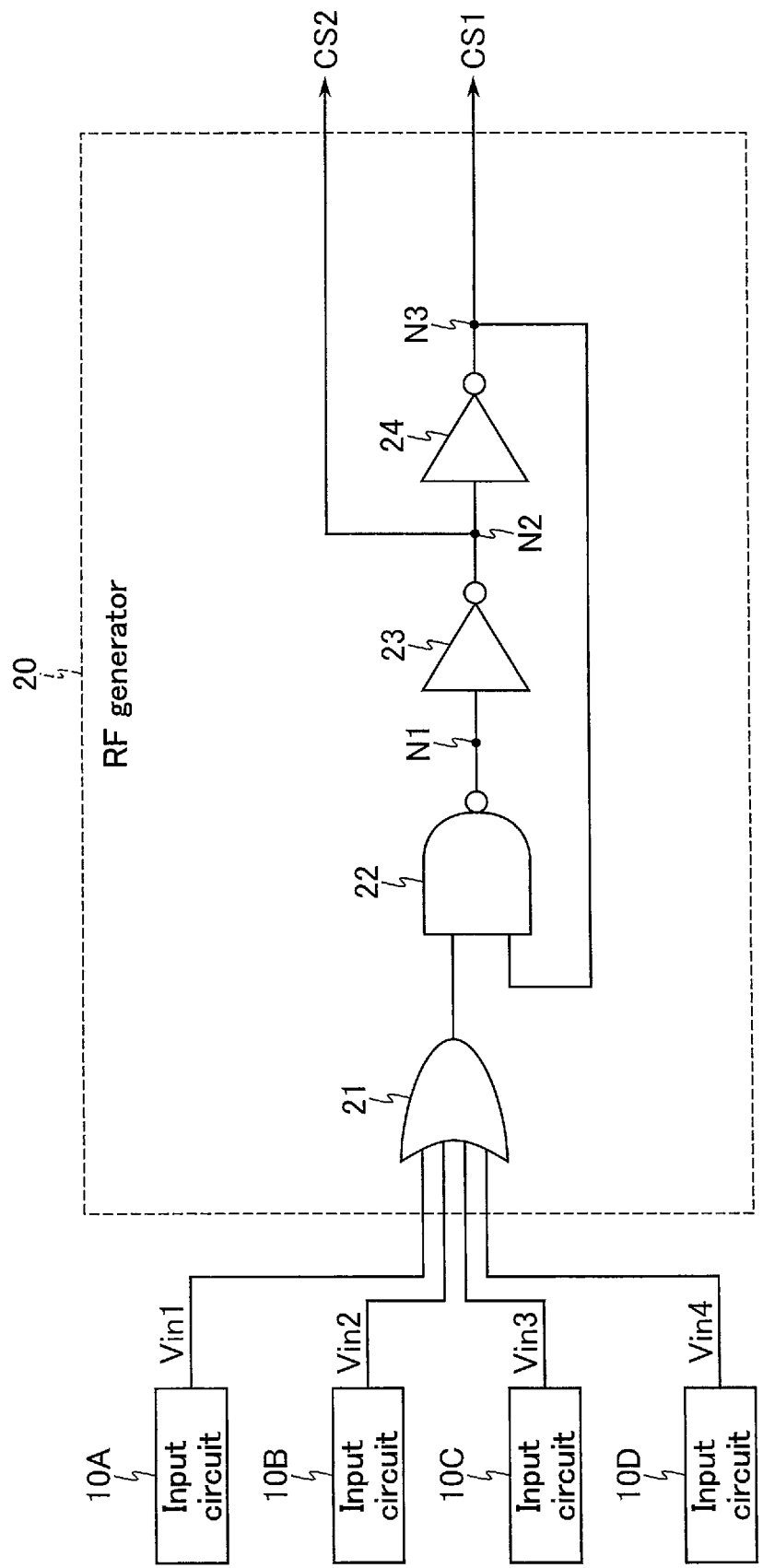
F I G. 22

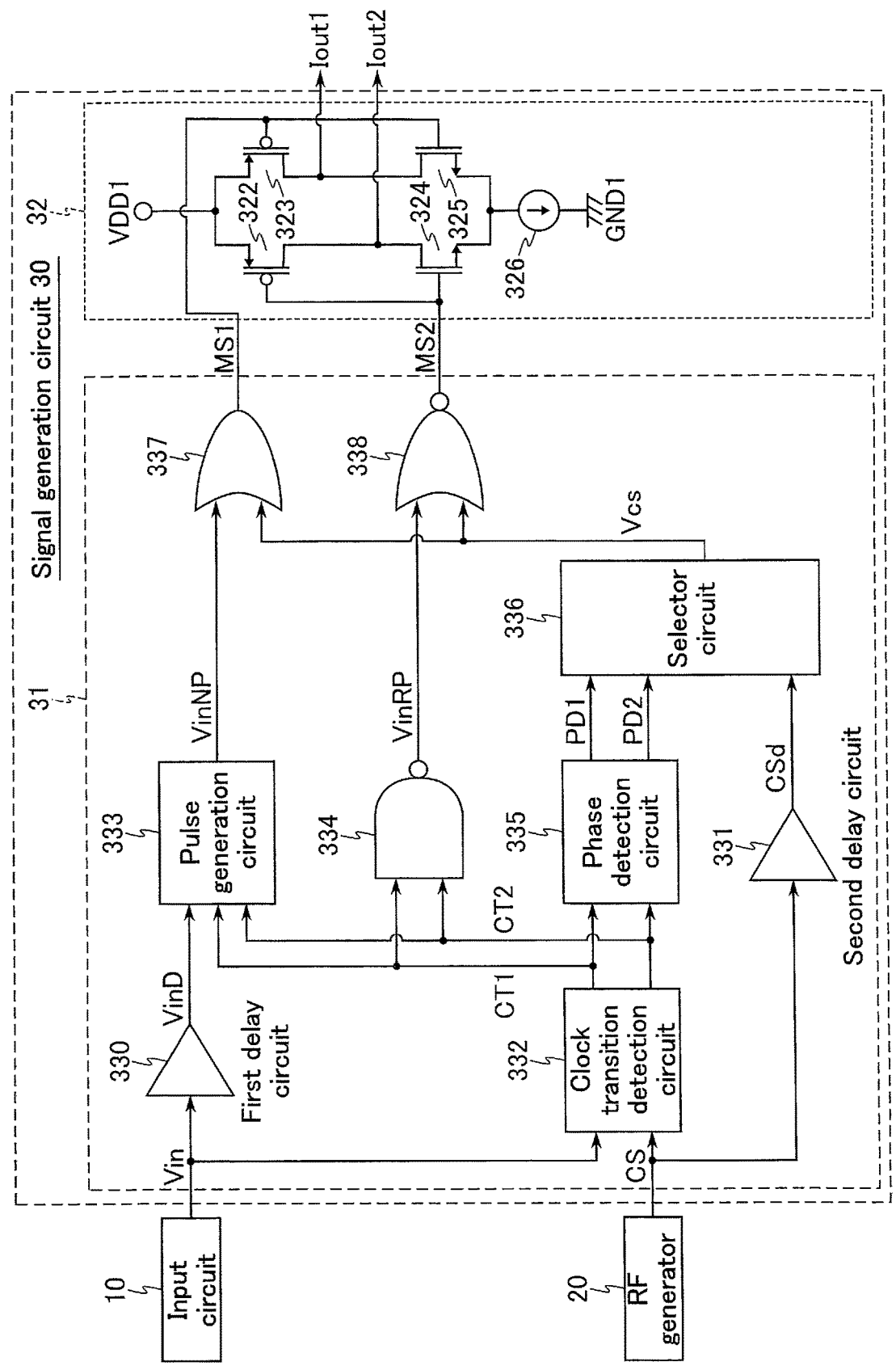
F I G. 23

COMMUNICATION DEVICE

CROSS-REFERENCE TO RELATED APPLICATIONS

This application is based upon and claims the benefit of priority from Japanese Patent Application No. 2020-118437, filed Jul. 9, 2020, the entire contents of which are incorporated herein by reference.

FIELD

Embodiments described herein relate generally to a communication device.

BACKGROUND

A galvanic isolation element has been known as an element of a communication device that connects a high-voltage device with a low-voltage device. A galvanic isolation element is incorporated in order to prevent noise from flowing between the high-voltage device and low-voltage device and also to prevent electrical shock. The galvanic isolation element allows for conveyance of a signal while maintaining electrical insulation of input and output. Examples of the media used for the conveyance of signals by the galvanic isolation element include light, an electrical field, and a magnetic field.

As galvanic isolation elements that adopt an optical signal as a signal conveyance medium, a photocoupler incorporating a light emitting diode (LED) as a light generation element and a photodiode (PD) as a light reception element has been known. A photocoupler ensures electrical insulation with a resin provided between the LED and PD. The photocoupler therefore provides a high reliability with regard to the insulating capability.

When a communication device is to transmit a plurality of signals, its photocoupler needs to have the same number of sets of LEDs and PDs as the number of transmission signals.

Multiple LEDs and PDs provided on a single photocoupler tend to cause crosstalk between the transmitted signals. Moreover, having a photocoupler with multiple LEDs and PDs may complicate its assembling process and thereby lower the reliability, and may increase manufacturing costs.

In contrast, a galvanic isolation element that utilizes an electric field or magnetic field as a signal conveyance medium can overcome the aforementioned drawbacks of the photocoupler. A galvanic isolation element using an electric field or magnetic field as a signal conveyance medium is also referred to as a digital isolator. When an electric field is adopted for a signal conveyance medium, an insulation capacitance having metal plates on the two ends of an insulating layer may be used. When a magnetic field is adopted for a signal conveyance medium, an insulation transformer having coils on the two ends of an insulating layer may be used. Multiple insulation capacitances or insulation transformers can be easily mounted on a single semiconductor substrate. For this reason, a communication device for transmitting multiple signals can reduce costs by adopting a digital isolator as a galvanic isolation element, in comparison to a device adopting a photocoupler.

BRIEF DESCRIPTION OF THE DRAWINGS

FIG. 4 is a circuit diagram showing an exemplary circuit configuration of an insulation element in the communication device according to the first embodiment.

FIG. 5 is a timing chart of an exemplary modulation operation of an input signal according to a comparative example of the first embodiment.

FIG. 11 is a circuit diagram showing an exemplary circuit configuration of a signal generation circuit in a communication device according to the second embodiment.

FIG. 12 is a circuit diagram showing an exemplary circuit configuration of an insulation element in the communication device according to the second embodiment.

FIG. 14 is a circuit diagram showing an exemplary circuit configuration of an insulation element in a communication device according to a modification example of the second embodiment.

FIG. 15 is a circuit diagram showing an exemplary circuit configuration of a signal generation circuit in the communication device according to the modification example of the second embodiment.

FIG. 16 is a block diagram showing an exemplary configuration of a communication device according to the third embodiment.

FIG. 18 is a block diagram showing an exemplary configuration of the communication device according to the first modification example of the third embodiment.

FIG. 20 is a block diagram showing an exemplary configuration of the communication device according to the second modification example of the third embodiment.

FIG. 21 is a circuit diagram showing an exemplary circuit configuration of an RF generator in a communication device according to the second modification example of the third embodiment.

FIG. 22 is a circuit diagram showing an exemplary circuit configuration of an RF generator in a communication device according to the third modification example of the third embodiment.

FIG. 23 is a circuit diagram showing an exemplary circuit configuration of a signal generation circuit in a communication device according to the fourth embodiment.

DETAILED DESCRIPTION

Figure 1:
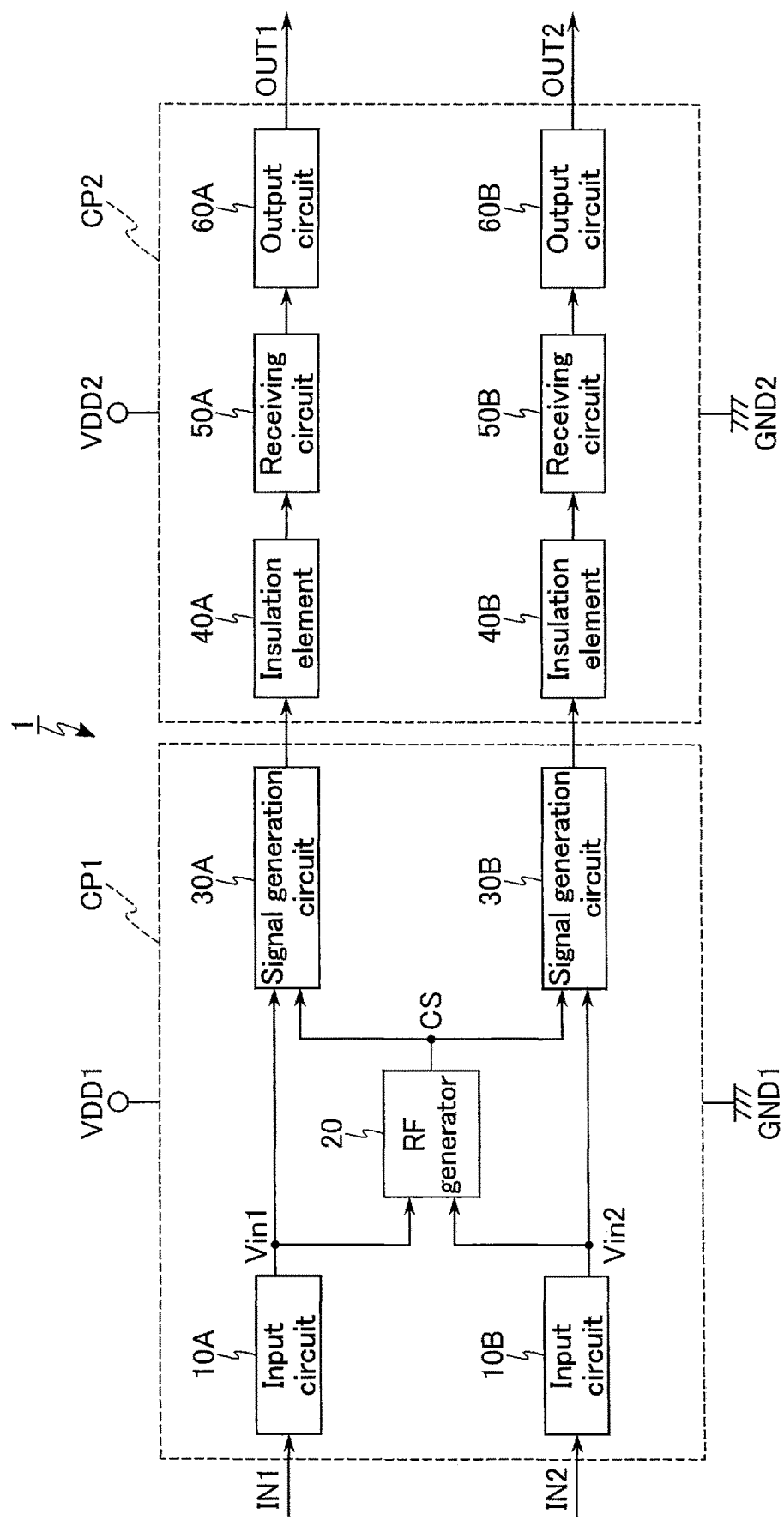
FIG. 1 is a block diagram showing an exemplary configuration of a communication device according to the first embodiment.

In general, according to one embodiment, a communication device includes an oscillator, a first signal generation circuit, a first insulation element, a first receiving circuit, and a first output circuit. The oscillator is configured to output a first carrier signal when at least one of a plurality of input signals that are externally input is at a first logic level. The first carrier signal and a first input signal among the input signals are input to the first signal generation circuit. The first signal generation circuit is configured to generate a first signal when the first input signal changes from a second logic level to the first logic level, output a first modulated signal based on the first signal, and thereafter output a second modulated signal based on the first carrier signal. The first signal generation circuit is configured to output a second logic level signal when the first input signal changes from the first logic level to the second logic level. The first insulation element is coupled to an output of the first signal generation circuit. The first receiving circuit is configured to perform signal reception via the first insulation element and signal demodulation, based on the output of the first signal generation circuit. The first output circuit is configured to externally output the signal demodulated by the first receiving circuit.

The embodiments will be explained below by referring to the drawings. The embodiments exemplify a device and method that realize the technical concept of the invention. The drawings are provided merely for schematic or conceptual purposes, and thus may not be identical to the actual dimensions and proportions. Furthermore, the technical concept of the invention is not limited by the form, configuration, arrangement or the like of the structural components.

In the following explanation, structural components having basically the same functions and configurations will be referred to by the same reference symbols. The reference symbols may contain a character string and numerals attached to the character string. When reference symbols containing the same character string are referenced, the corresponding components have the same configuration, and are distinguished from each other by the numerals attached to the character strings. Similarly, a character string attached to numerals of a reference symbol of a component is used to distinguish this component from other components that are referenced by symbols containing the same numerals and have similar configurations.

[1] First Embodiment

The first embodiment relates to a communication device for transmitting two signals using a galvanic isolation element, or in other words a multichannel communication device. A communication device 1 according to the first embodiment will be explained below, in which an insulation transformer is adopted as a galvanic isolation element.

[1-1] Configuration

[1-1-1] Overall Configuration of Communication Device 1

FIG. 1 shows an exemplary configuration of the communication device 1 according to the first embodiment. As illustrated in FIG. 1, the communication device 1 according to the first embodiment may include input circuits 10A and 10B, a radio frequency (RF) generator 20, signal generation circuits 30A and 30B, insulation elements 4 OA and 40B, receiving circuits 50A and 50B, and output circuits 60A and 60B.

The input circuits 10 are used for inputting signals from external devices to the communication device 1, and may include a buffer circuit. Input signals IN1 and IN2 are input from an external device to the input circuits 10A and 10B, respectively.

The input circuit 10A outputs an input signal Vin1 based on the input signal IN1 to the RF generator 20 and signal generation circuit 30A. The input circuit 10B outputs an input signal Vin2 based on the input signal IN2 to the RF generator 20 and signal generation circuit 30B.

The RF generator 20 may be a signal generator such as a ring oscillator circuit. The RF generator 20 generates and outputs a carrier signal CS based on the input signal Vin1 input by the input circuit 10A and the input signal Vin2 input by the input circuit 10B. The carrier signal CS is input to the signal generation circuits 30A and 30B.

A signal generation circuit 30 modulates an input signal Vin (modulation signal) input by the input circuit 10, using the carrier signal CS. The signal generation circuit 30 outputs a modulated electrical signal (modulated signal) to an insulation element 40. Specifically, the signal generation circuit 30A modulates the input signal Vin1 and outputs the resultant signal to the insulation element 40A. The signal generation circuit 30B modulates the input signal Vin2 and outputs the resultant signal to the insulation element 40B.

An insulation element 40 is a galvanic isolation element adopted in On-Off Keying (OOK), which may include an insulation transformer. The insulation element 40 according to the first embodiment transmits signals using magnetic coupling. The insulation element 40A transmits the electrical signals input by the signal generation circuit 30A to the receiving circuit 50A. The insulation element 40B transmits the electrical signal input by the signal generation circuit 30B to the receiving circuit 50B.

A receiving circuit 50 includes a demodulation circuit. The receiving circuit 50A detects and demodulates the electrical signal transmitted from the insulation element 40A, and outputs the resultant signal to the output circuit 60A. The receiving circuit 50B detects and demodulates the electrical signal transmitted from the insulation element 40B, and outputs the resultant signal to the output circuit 60B.

An output circuit 60 is used for outputting a signal via the insulation element 40 in the communication device 1 to the outside, and may include a buffer circuit. The output circuit 60A outputs an output signal OUT1 to an external device based on the signal input from the receiving circuit 50A. The output circuit 60B outputs an output signal OUT2 to an external device based on the signal input from the receiving circuit 50B.

In the above-explained configuration of the communication device 1, a group of the input circuit 10A, signal generation circuit 30A, insulation element 40A, receiving circuit 50A, and output circuit 60A corresponds to the first channel of the communication device 1. Similarly, a group of the input circuit 10B, signal generation circuit 30B, insulation element 40B, receiving circuit 50B, and output circuit 60B corresponds to the second channel of the communication device 1. That is, the communication device 1 according to the first embodiment is a two-channel communication device capable of transmitting two types of signals.

In the communication device 1 according to the first embodiment, a group of the input circuits 10A and 10B, RF generator 20, and signal generation circuits 30A and 30B may consist of semiconductors mounted on the first circuit board. A group of the insulation elements 40A and 40B, receiving circuits 50A and 50B, and output circuits 60A and 60B may consist of semiconductors mounted on the second circuit board, which differs from the first circuit board. The circuit on the first circuit board is electrically coupled to the circuit on the second circuit board, for example by bonding wire.

Hereinafter, the group of the first circuit board and the circuits thereon will be referred to as a chip CP1, and the group of the second circuit board and the circuits thereon will be referred to as a chip CP2. For instance, the circuits in the chip CP1 are coupled to a ground GND1 so that a source voltage VDD1 is applied to the circuits in the chip CP1. The circuits in the chip CP2 are coupled to a ground GND2 so that a source voltage VDD2 is applied to the circuits in the chip CP2. One of the source voltages VDD1 and VDD2 corresponds to a high-voltage system, while the other corresponds to a low-voltage system.

[1-1-2] Circuit Configuration of Communication Device 1

Exemplary circuit configurations of the RF generator 20, signal generation circuit 30, and insulation element 40 in the communication device 1 according to the first embodiment will be separately explained.
(Circuit Configuration of RF Generator 20)

Figure 2:
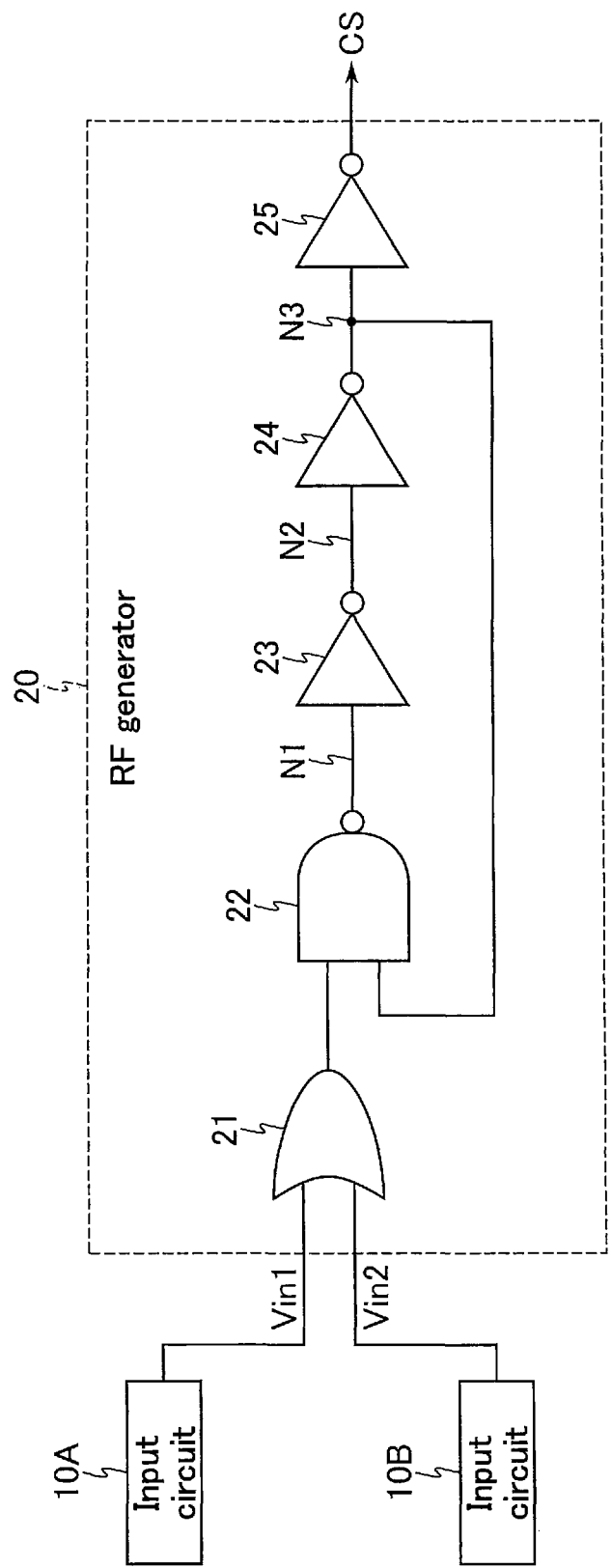
FIG. 2 is a circuit diagram showing an exemplary circuit configuration of an RF generator in the communication device according to the first embodiment.

FIG. 2 shows an exemplary circuit configuration of the RF generator 20 in the communication device 1 according to the first embodiment. As illustrated in FIG. 2, the RF generator 20 according to the first embodiment may include an OR circuit 21, a NAND circuit 22, and inverters 23, 24 and 25.

The input signal Vin1, which is output from the input circuit 10A, is input to the first input end of the OR circuit 21. The input signal Vin2, which is output from the input circuit 10B, is input to the second input end of the OR circuit 21. The output end of the OR circuit 21 is coupled to the first input end of the NAND circuit 22. The output end of the NAND circuit 22 is coupled to the input end of the inverter 23. The output end of the inverter 23 is coupled to the input end of the inverter 24. The output end of the inverter 24 is coupled to the input end of the inverter 25 and to the second input end of the NAND circuit 22. The signal output from the inverter 25 corresponds to the carrier signal CS.

The method for generating a carrier signal CS by the RF generator 20 will be briefly explained below. Hereinafter, the node corresponding to the output end of the NAND circuit 22 will be referred to as "N1"; the node corresponding to the output end of the inverter 23 will be referred to as "N2"; and the node corresponding to the output end of the inverter 24 will be referred to as "N3".

When the input signals Vin1 and Vin2 are both at "L" level, the OR circuit 21 outputs a voltage at "L" level. With the voltage at "L" level input to the first input end, the NAND circuit 22 outputs a voltage at "H" level. The voltages at the nodes N1, N2 and N3 thereby become "H", "L" and "H" levels, respectively, and the inverter 25 therefore outputs the voltage at "L" level. When the voltage at the node N3 is at "H" level, the first input end and second input end of the NAND circuit 22 have different input voltages. Thus, the output of the NAND circuit 22 is maintained at "H" level. As a result, when the input signals Vin1 and Vin2 are both at "L" level, the carrier signal CS maintains the "L" level.

On the other hand, when at least one of the input signals Vin1 and Vin2 is at "H" level, the OR circuit 21 outputs a voltage at "H" level. With the voltage at "H" level input to the first input end, the NAND circuit 22 outputs a voltage at "L" level, for example when the voltage of the second input end is at "H" level. As a result, the voltages of the nodes N1, N2 and N3 become "L", "H" and "L" levels, respectively, and the inverter 25 therefore outputs a voltage at "H" level.

When the voltage of the node N3 is at "L" level, a voltage at "H" level is input to the first input end of the NAND circuit 22, and a voltage at "L" level is input to its second input end. In response to this, the output voltage of the NAND circuit 22 changes from "L" level to "H" level. Thus, the voltages at the nodes N1, N2 and N3 become "H", "L" and "H" levels, respectively, and the inverter 25 outputs the voltage at "L" level. When at least one of the input signals Vin1 and Vin2 is at "H" level, the above operations are repeated, thereby the output of the carrier signal CS oscillating.

As described above, the RF generator 20 according to the first embodiment generates a carrier signal CS using an OR signal of the input signal Vin1 and input signal Vin2. The above circuit configuration of the RF generator 20 has been described as a mere example. The RF generator 20 may have a different circuit configuration as long as a carrier signal CS can be generated in response to at least one of the input signals Vin1 and Vin2 turning to "H" level.
(Circuit Configuration of Signal Generation Circuit 30)

Figure 3:
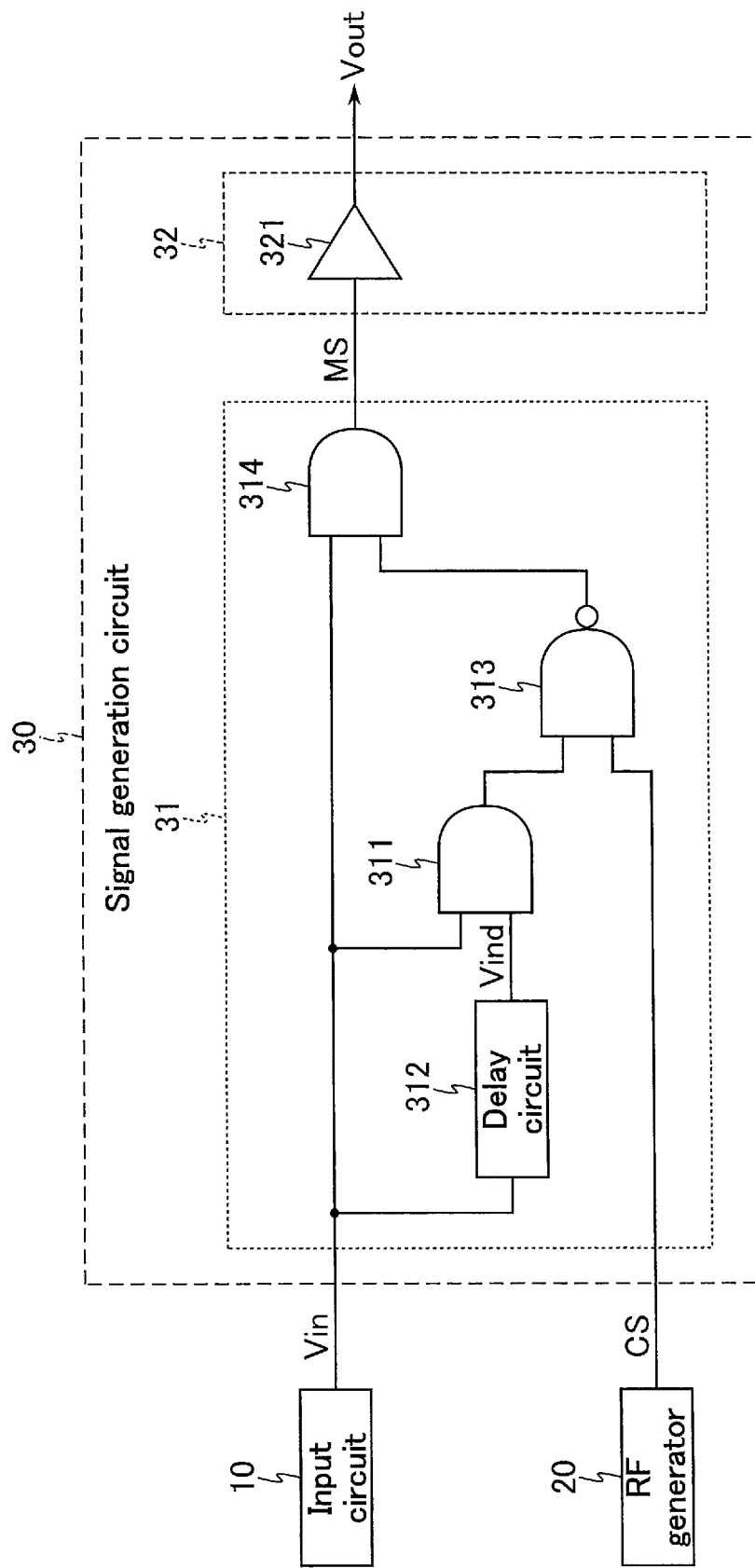
FIG. 3 is a circuit diagram showing an exemplary circuit configuration of a signal generation circuit in the communication device according to the first embodiment.

FIG. 3 shows an exemplary circuit configuration of the signal generation circuit 30 in the communication device 1 according to the first embodiment. As illustrated in FIG. 3, the signal generation circuit 30 according to the first embodiment may include a signal generation part 31 and a drive part 32. The signal generation circuit 30 may include an AND circuit 311, a delay circuit 312, a NAND circuit 313, and an AND circuit 314.

The drive part 32 may include a drive circuit 321.

An input signal Vin (modulation signal) is input to the first input end of the AND circuit 311. An input signal Vind, which corresponds to the input signal Vin delayed by way of the delay circuit 312, is input to the second input end of the AND circuit 311. The delay circuit 312 may be formed of an even number of serially coupled inverters. Alternatively, a different circuit may be used as a delay circuit 312.

The first input end of the NAND circuit 313 is coupled to the output end of the AND circuit 311. A carrier signal CS is input to the second input end of the NAND circuit 313. An input signal Vin is input to the first input end of the AND circuit 314. The second input end of the AND circuit 314 is coupled to the output end of the NAND circuit 313. The AND circuit 314 outputs a modulated signal MS. The drive circuit 321 amplifies this modulated signal MS and outputs an output voltage Vout.

The signal generation circuit 30 according to the first embodiment explained above is capable of modulating the input signal Vin based on the carrier signal CS. For instance, when the input signal Vin is at "L" level, the output voltage Vout of the signal generation circuit 30 becomes a voltage at "L" level, while when the input signal Vin is at "H" level, the output voltage Vout becomes a voltage based on the carrier signal CS generated by the RF generator 20. The above circuit configuration of the signal generation circuit 30 has been described as a mere example. The signal generation circuit 30 may have a different circuit configuration as long as the input signal Vin can be modulated based on the carrier signal CS.

(Circuit Configuration of Insulation Element 40)

FIG. 4 shows an exemplary circuit configuration of the insulation element 40 in the communication device 1 according to the first embodiment. As illustrated in FIG. 4, the insulation element 40 according to the first embodiment may include coils 41 and 42.

The coil 41 faces the coil 42 with an insulation layer ISO interposed. As the insulation layer ISO, an oxide film may be used, or polyimide may be used. The output voltage Vout is applied to one end of the coil 41 by the signal generation circuit 30 in the chip CP1. The other end of the coil 41 is grounded in the chip CP1. One end of the coil 42 is coupled to the receiving circuit 50. The other end of the coil 42 is grounded in the chip CP2.

In the above insulation element 40 according to the first embodiment, magnetic coupling is formed between the coil 41 and coil 42. With this magnetic coupling, the output voltage Vout applied to the coil 41 is transmitted to the coil 42, and the transmitted output voltage Vout is applied to the receiving circuit 50. The above circuit configuration of the insulation element 40 is explained as a mere example. The insulation element 40 may have a different circuit configuration as long as the output voltage Vout can be transmitted through magnetic coupling.

[1-2] Operations

[1-2-1] Modulation of Input Signal

The communication method utilizing an insulation transformer or an insulation capacitance modulates an input signal to a high frequency band, thereby enhancing the efficiency. Edge encoding and on-off keying (OOK) have been known as digital isolator modulation schemes. From the aspect of current consumption during low-speed communications, edge encoding is more advantageous, whereas from the aspect of current consumption and communication delay during high-speed communication, OOK is more advantageous. The communication device 1 according to the first embodiment adopts the OOK scheme.

FIG. 5 shows an exemplary basic operation of modulating an input signal. As illustrated in FIG. 5, the input signal may be a voltage at "L" level or "H" level, and includes 1-bit information. With the input signal at "H" level, the RF generator 20 is turned on, and with the input signal at "L" level, the RF generator 20 is turned off. Because of the RF generator 20 that operates in accordance with the input signal becoming "H" level, a carrier signal oscillates during a period of the input signal being at "H" level. A modulated signal is a signal generated based on the carrier signal during the period of the input signal being at "H" level. The modulated signal therefore oscillates in the same manner as the carrier signal during the period of the input signal being at "H" level.

[1-2-2] Operation of Communication Device 1

Figure 6:
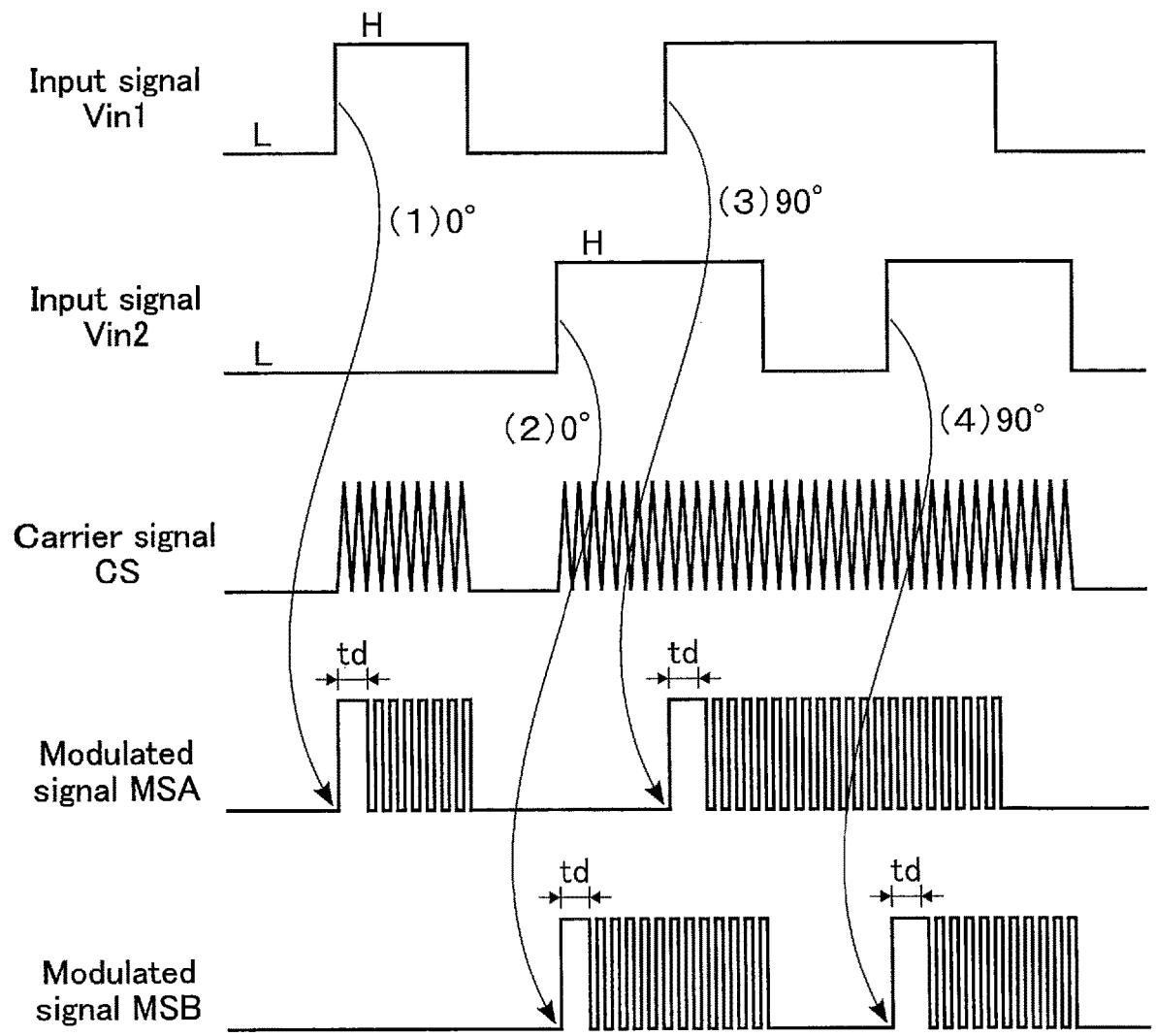
FIG. 6 is a timing chart of an exemplary operation on the communication device according to the first embodiment.

FIG. 6 shows an exemplary timing chart of the operation of the communication device 1 according to the first embodiment. "MSA" denotes a modulated signal corresponding to the input signal Vin1, and "MSB" denotes a modulated signal corresponding to the input signal Vin2. Arrows (1) to (4) indicate the timings at which the input signals Vin transitions from "L" level to "H" level.

When the input signal Vin1 is turned to "H" level with the input signal Vin2 being at "L" level as indicated by (1) in FIG. 6, the RF generator 20 is turned on, the output of the carrier signal CS oscillating. Here, in the signal generation circuit 30A, the voltage at the first input end of the AND circuit 314 is turned to "H" level in accordance with the input signal Vin1, and the voltage at the second input end of the AND circuit 314 is turned to a level based on the carrier signal CS, AND circuit 311, delay circuit 312, and NAND circuit 313.

Specifically, a voltage at "H" level is applied to the first input end of the AND circuit 311, and a voltage at "L" level is applied to the second input end until a delay time td provided by the delay circuit 312 elapses. The AND circuit 311 therefore outputs a signal at "L" level. This turns the voltage at the first input end of the NAND circuit 313 to "L" level, and therefore the NAND circuit 313 inputs a voltage at "H" level to the second input end of the AND circuit 314, regardless of the state of the carrier signal CS. As a result, the output of the AND circuit 314 is maintained at "H" level.

On the other hand, after the delay time td elapses, a voltage at "H" level is applied to both the first input end and second input end of the AND circuit 311. This causes the AND circuit 311 to output a signal at "H" level, and turns the voltage at the first input end of the NAND circuit 313 to "H" level. With the carrier signal CS oscillating, the NAND circuit 313 inputs an inversion signal of the carrier signal CS to the second input end of the AND circuit 314. As a result, the output of the AND circuit 314 oscillates based on the carrier signal CS.

As described above, the output of the AND circuit 314, or in other words the modulated signal MSA, is turned to "H" level in response to the input signal Vin1 turned to "H" level, and maintains this "H" level until the delay time td elapses. After the delay time td elapses, the modulated signal MSA oscillates based on the carrier signal CS. When the input signal Vin1 is turned to "L" level, the RF generator 20 is turned off, as a result of which the oscillation of the carrier signal CS and the oscillation of the modulated signal MSA are terminated.

When the input signal Vin2 is turned to "H" level with the input signal Vin1 being at "L" level as indicated by (2) in FIG. 6, the RF generator 20 is turned on, the output of the carrier signal CS oscillating. The operation of the signal generation circuit 30B is similar to that of the signal generation circuit 30A in (1) of FIG. 6. In each of (1) and (2) of FIG. 6, the carrier signal CS oscillates based on an input signal Vin that turns to "H" level. With synchronization achieved between the input signal Vin and the carrier signal CS, the phase of the carrier signal CS is 0° when the input signal Vin is transitioning from "L" level to "H" level.

When the input signal Vin1 is turned to "H" level with the input signal Vin2 being at "H" level, as indicated in (3) of FIG. 6, the input signal Vin1 is modulated based on the carrier signal CS that has already been oscillated. That is, the carrier signal CS of the RF generator 20 becomes asynchronous to the input signal Vin1 of the input circuit 10A. For this reason, based on the timing of the input signal Vin1 transitioning from "L" level to "H" level, a discrepancy occurs between this timing and the phase of the carrier signal CS. The phase difference of the carrier signal CS with respect to the input signal Vin1 being 90° is illustrated in (3) of FIG. 6.

Under the above situation, in the signal generation circuit 30A, the AND circuit 314 immediately outputs a voltage at "H" level in response to the input signal Vin1 turning to "H" level. That is, the modulated signal MSA turns to "H" level in response to the input signal Vin1 turning to "H" level. After the delay time td elapses, the modulated signal MSA starts oscillating based on the carrier signal CS.

After both the input signals Vin1 and Vin2 turn to "H" level, only the input signal Vin2 changes to "L" level. In this case, based on the input signal Vin2 transitioning from "H" level to "L" level, the oscillation of the modulated signal MSB is terminated. On the other hand, with the input signal Vin1 maintaining "H" level, the RF generator 20 maintains its ON state. That is, when either one of the input signals Vin is at "H" level, the RF generator 20 maintains the carrier signal CS in the oscillation state.

When the input signal Vin2 is turned to "H" level with the input signal Vin1 being at "H" level, as indicated in (4) of FIG. 6, the input signal Vin2 is modulated based on the carrier signal CS that has already been oscillated. That is, the carrier signal CS of the RF generator 20 becomes asynchronous to the input signal Vin2 of the input circuit 10B. In the same manner as (3) of FIG. 6, the phase difference of the carrier signal CS with respect to the input signal Vin2 being 90° is illustrated in (4) of FIG. 6.

In this case also, in the signal generation circuit 30B, the AND circuit 314 immediately outputs a voltage at level "H" in response to the input signal Vin2 turning to "H" level. That is, the modulated signal MSB turns to "H" level in response to the input signal Vin2 turning to "H" level. After the delay time td elapses, the modulated signal MSB starts oscillating based on the carrier signal CS.

After both the input signals Vin1 and Vin2 return to "H" level, only the input signal Vin1 changes to "L" level. In this case, the oscillation of the modulated signal MSA is terminated, based on the input signal Vin1 transitioning from "H" level to "L" level. On the other hand, with the input signal Vin2 maintaining "H" level, the RF generator 20 maintains its ON state. When the input signal Vin2 turns to "L" level, the oscillation of the modulated signal MSB is terminated. When both the input signals Vin1 and Vin2 turn to "L" level, the RF generator 20 turns to an OFF state, which turns the carrier signal CS to "L" level.

As described above, in the communication device 1 according to the first embodiment, in response to the input signal Vin turning to "H" level, the corresponding modulated signal MS immediately turns to "H" level. After the delay time td elapses, or in other words after at least one pulse corresponding to the delay time td is applied, the modulated signal MS becomes a pulse based on the carrier signal CS.

[1-3] Effects of First Embodiment

With the above-described communication device 1 according to the first embodiment, the amount of jitter can be suppressed in a communication device having a single RF generator. The effects of the communication device 1 according to the first embodiment will be discussed in detail below.

Use of an AND signal of an RF carrier (e.g., a carrier signal CS) and an input signal has been known as a modulation method of a communication device adopting the OOK scheme. When the communication device incorporates multiple channels, it is preferable that an RF generator for generating an RF carrier be arranged for each channel. The arrangement of multiple RF generators, however, tends to increase power consumption and the chip area. In order to reduce power consumption in a multi-channel communication device, one RF generator may be shared by multiple channels.

A comparative example of the first embodiment will be explained, where a communication device having multiple inputs incorporates a single RF generator 20 and uses, as a modulated signal MS, a signal obtained through an AND operation executed on an input signal Vin and a carrier signal CS. In brief, the communication device according to the comparative example of the first embodiment may have a configuration in which the AND circuit 311, delay circuit 312, and NAND circuit 313 are omitted from the signal generation circuit 30 of FIG. 3, with the RF generator 20 directly coupled to the second input end of the AND circuit 314.

Figure 7:
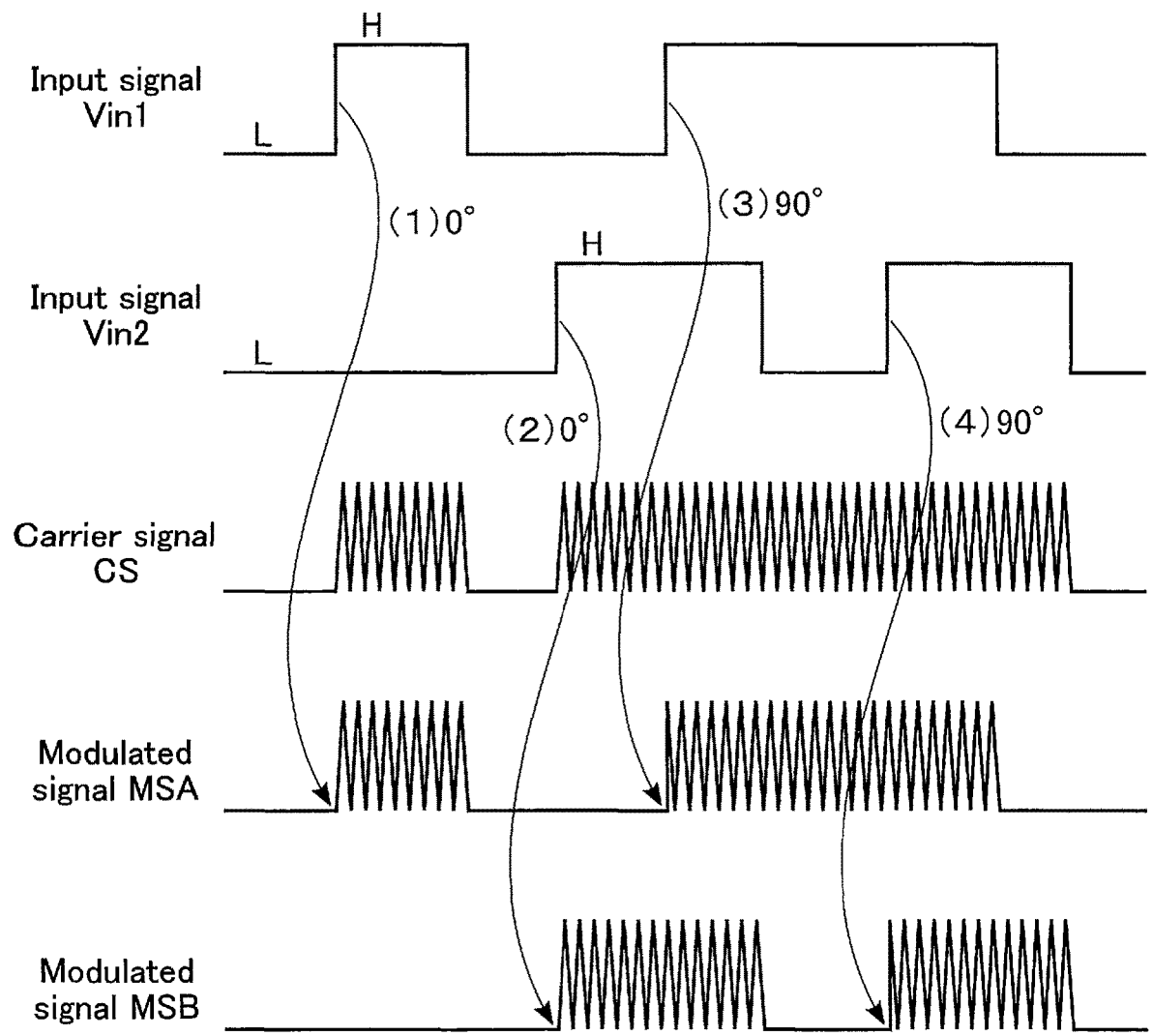
FIG. 7 is a timing chart of an exemplary operation on a communication device according to a comparative example of the first embodiment.

FIG. 7 shows an exemplary timing chart of the operation of the communication device according to the comparative example of the first embodiment, where the input signals Vin1 and Vin2 are turned to "H" level similarly to the timing in FIG. 6. When the RF generator 20 operates using an AND signal of the input signals Vin1 and Vin2, modulated signals MSA and MSB as illustrated FIG. 7 can be obtained.

As illustrated in FIG. 7, in the situation of both the input signals Vin1 and Vin2 being at "L" level, when either one of the input signals Vin1 and Vin2 is turned to "H" level, the modulated signal MSA or MSB is oscillated in the same manner as the carrier signal CS. When the input signal Vin is synchronous to the carrier signal CS as illustrated in (1) and (2) of FIG. 7, the phase difference of the carrier signal CS at the timing of the input signal Vin transitioning from "L" level to "H" level is 0°.

On the other hand, when one of the input signals Vin is at "H" level, and the other one of the input signals Vin transitions from "L" level to "H" level as illustrated in (3) and (4) of FIG. 7, the input signal Vin becomes asynchronous to the carrier signal CS. If this is the case, based on the timing of the input signal Vin transitioning from "L" level to "H" level, a discrepancy occurs between this timing and the phase of the carrier signal CS. The phase of the carrier signal CS being 90° when the input signal Vin1 is input is illustrated in (3) of FIG. 7, while the phase of the carrier signal CS being 90° when the input signal Vin2 is input is illustrated in (4) of FIG. 7.

In the communication device 1 according to the comparative example of the first embodiment, when the transition of the input signal Vin is synchronous with the carrier signal CS, or in other words when the input signal Vin is input during the RF generator 20 being in an OFF state, the waveform at the rising edge of the modulated signal MS can be formed substantially the same as the waveform at the rising edge of the carrier signal CS. If this is the case, the communication device 1 can generate the output signals OUT1 and OUT2 in such a manner as to have substantially the same waveform.

On the other hand, in the communication device 1 according to the comparative example of the first embodiment, if an input signal Vin is input at the time of the RF generator 20 being in the ON state, the transition of the input signal Vin cannot be brought into synchronization with the carrier signal CS. This may cause a phase difference between the rising edge of the input signal Vin and the rising edge of the carrier signal CS. If the phase difference occurs, the voltage value of the carrier signal CS input to the AND circuit 314 may vary, resulting in a random waveform of the modulated signal MS at the rising edge. Variations in the waveform of the modulated signal MS at the rising edge are reflected in the waveforms of the output signals OUT1 and OUT2. Variations in the waveform of the modulated signal MS at the rising edge based on the operation timings of the input signals Vin and carrier signal CS may lead to jittering and reduction in the operational stability of the receiving circuits 50.

In contrast, the communication device 1 according to the first embodiment uses the signal generation circuit 30 having the delay circuit 312 for modulation of the input signals Vin. The communication device 1 according to the first embodiment includes an AND circuit 311 having the first input end and second input end, where an input signal Vin is input to the first input end and the input signal Vin is input to the second input end via the delay circuit 312; and a NAND circuit 313 having the first input end, second input end and output end, where the output of the AND circuit 311 is coupled to the first input end of the NAND circuit 313, the output of the RF generator 20 is coupled to the second input end of the NAND circuit 313, and the second input end of the AND circuit 314 is coupled to the output end of the NAND circuit 313.

In the signal generation circuit 30 according to the first embodiment, when the input signal Vin is turned to "H" level, the AND circuit 314 turns the modulated signal MS to "H" level, regardless of the state of the carrier signal CS. Furthermore, the RF generator 20 is turned to the ON state in accordance with the input of the input signal Vin. The input of the signal oscillated based on the carrier signal CS to the AND circuit 314 is delayed by the AND circuit 311, delay circuit 312, and NAND circuit 313. For this reason, the modulated signal MS is maintained at "H" level after the input signal Vin is turned to "H" level until the delay time td provided by the delay circuit 312 elapses. When the delay time td elapses, the output of the AND circuit 311 is turned to "H" level, and the NAND circuit 313 outputs a signal oscillated based on the carrier signal CS. Thus, the input signal Vin is modulated based on the carrier signal CS after the delay time td elapses after the input signal Vin turns to "H" level.

As described above, the communication device 1 according to the first embodiment turns the modulated signal MS to "H" level based on the input signal Vin, regardless of whether or not the RF generator 20 is in the ON state. Unlike the comparative example, in the communication device 1 according to the first embodiment, the modulated signals MS at the rising edge form the similar waveform when the input signal Vin is synchronous with the carrier signal CS, and the modulated signals MS at the rising edge also form the similar waveform when the input signal Vin is asynchronous to the carrier signal CS.

In this manner, the communication device 1 according to the first embodiment prevents the rising edge of the modulated signal MS from varying. This suppresses variation in the waveforms of the output signal OUT1 and OUT2. In addition, the communication device 1 according to the first embodiment can input a signal oscillated based on the carrier signal CS to the AND circuit 314 after the delay time td provided by the delay circuit 312, thereby realizing OOK communications.

As a result, the communication device 1 according to the first embodiment can suppress jitters of the output signal OUT and stabilize the operation of the receiving circuit 50. Thus, in the communication device 1 according to the first embodiment, a digital isolator having a multi-channel configuration for transmitting signals with the OOK scheme can transmit high-quality signals using a single RF carrier generation circuit. Furthermore, the communication device 1 according to the first embodiment, which operates multiple channels with a single RF generator 20, can suppress power consumption and reduce the chip area.

As described above, the communication device 1 according to the first embodiment uses carrier signals CS relating to the individual insulation devices, in synchronization. From this aspect, the communication device 1 according to the first embodiment may be configured such that the phases of the insulation devices are individually regulated. With the phases of the insulation devices regulated, the communication device 1 according to the first embodiment can suppress electromagnetic interference (EMI).

[1-4] Modification Examples of First Embodiment

Various modifications can be made to the above communication device 1 according to the first embodiment. The first to third modification examples will be described below, focusing on differences with respect to the first embodiment.

[1-4-1] First Modification Example of First Embodiment

Figure 8:
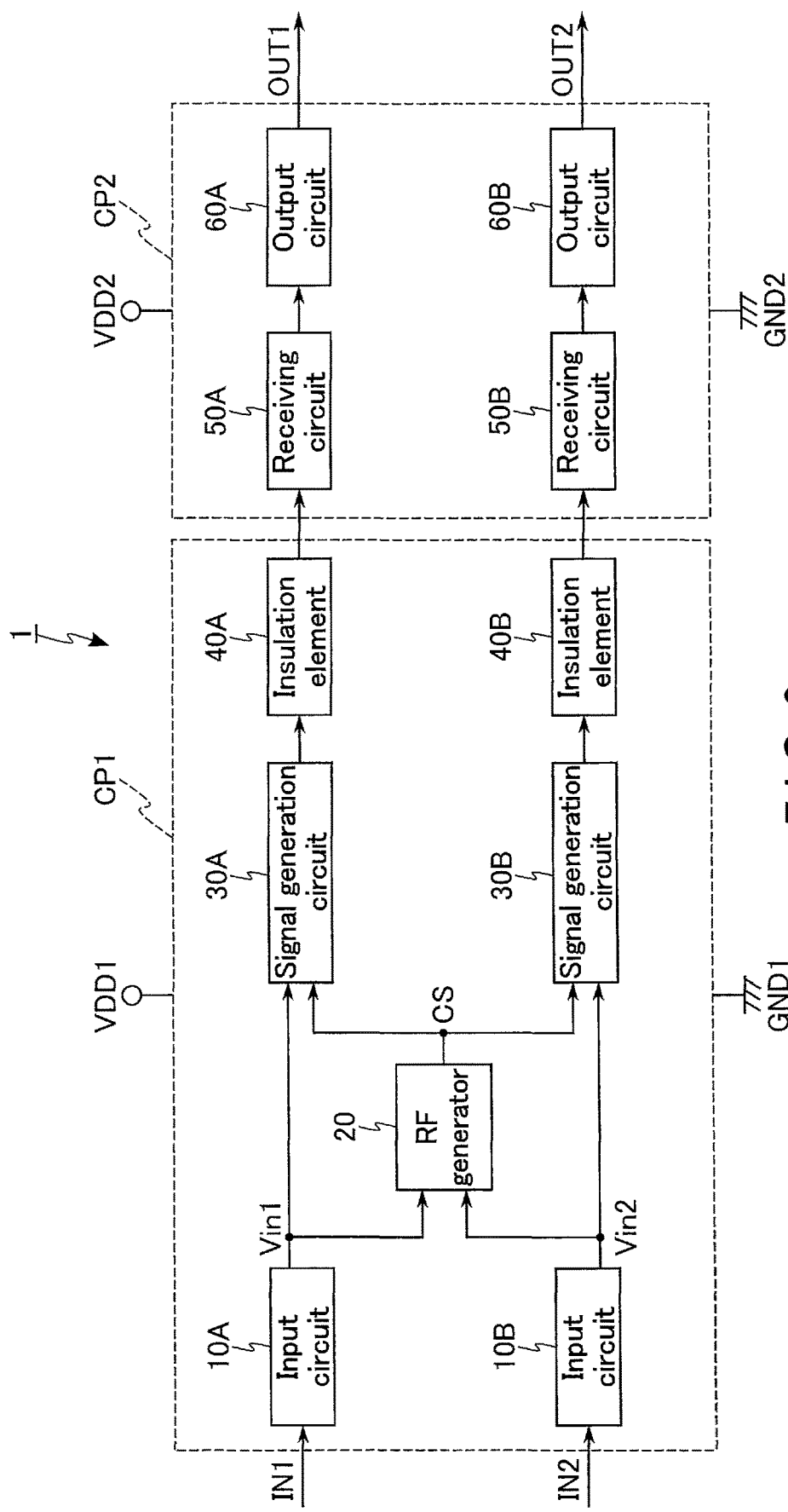
FIG. 8 is a block diagram showing an exemplary configuration of a communication device according to the first modification example of the first embodiment.

FIG. 8 shows an exemplary configuration of the communication device 1 according to the first modification example of the first embodiment. As illustrated in FIG. 8, in comparison with the first embodiment, the communication device 1 according to the first modification example of the first embodiment differs in the combination of the circuits in the chip CP1 and the circuits in the chip CP2.

Specifically, in the communication device 1 according to the first modification example of the first embodiment, a group of the input circuits 10A and 10B, RF generator 20, signal generation circuits 30A and 30B, and insulation elements 40A and 40B is arranged in the chip CP1. On the other hand, a group of the receiving circuits 50A and 50B, and output circuits 60A and 60B is arranged in the chip CP2.

That is, the communication device 1 may be configured such that the insulation elements 40A and 40B are arranged in the chip CP1, instead of in the chip CP2. Whether the insulation elements 40A and 40B are in the chip CP1 or CP2, the communication device 1 offers the similar effects as the first embodiment. The arrangement of a single insulation element 40 for each channel and in either one of chips CP1 and CP2 in the communication device 1 is referred to as single isolation.

[1-4-2] Second Modification Example of First Embodiment

Figure 9:
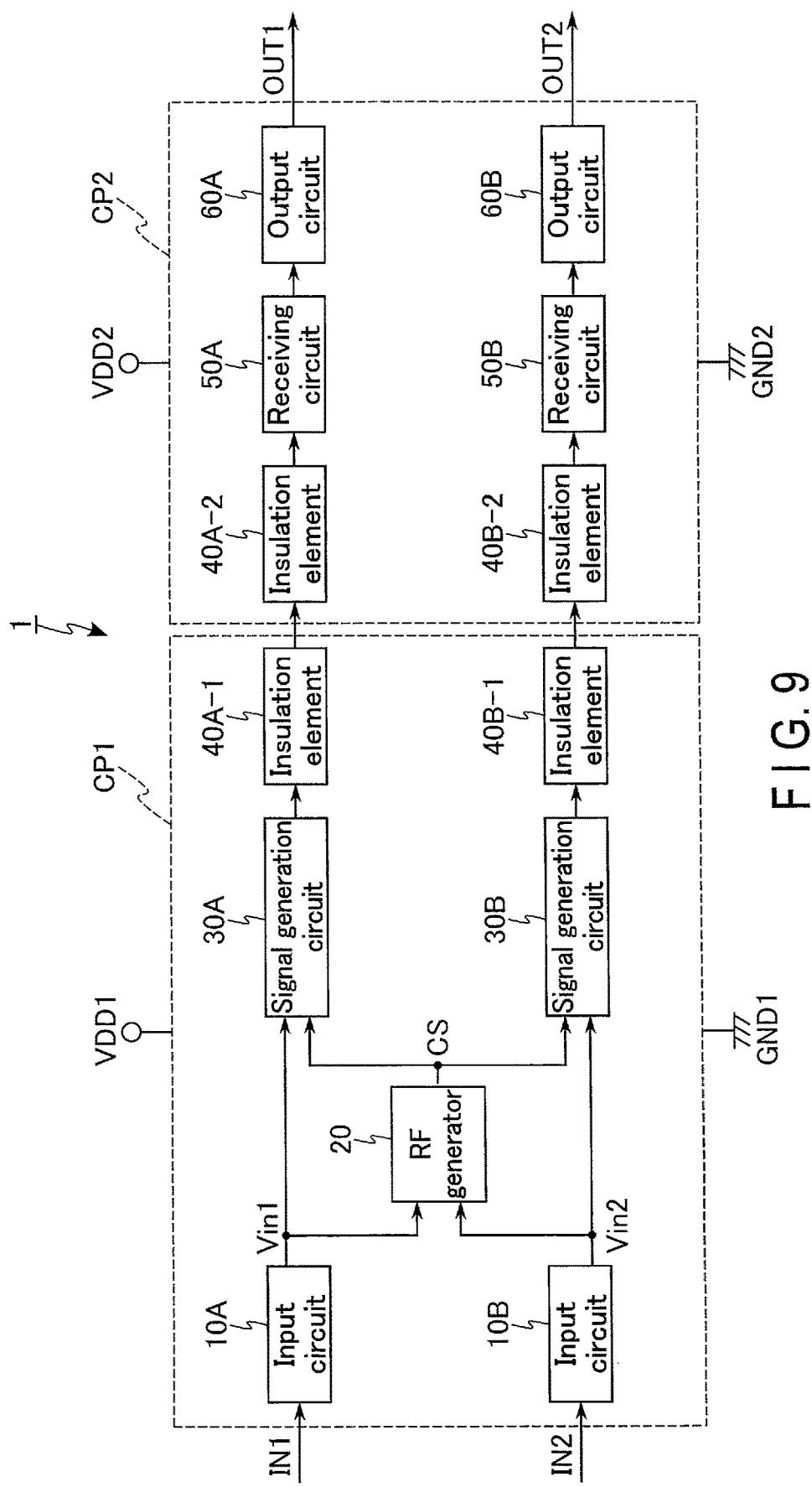
FIG. 9 is a block diagram showing an exemplary configuration of a communication device according to the second modification example of the first embodiment.

FIG. 9 shows an exemplary configuration of the communication device 1 according to the second modification example of the first embodiment. As illustrated in FIG. 9, the insulation elements 40A and 40B may be arranged in both the chips CP1 and CP2.

Specifically, in the communication device 1 according to the second modification example of the first embodiment, a group of the input circuits 10A and 10B, RF generator 20, signal generation circuits 30A and 30B, and insulation elements 40A-1 and 40B-1 are arranged in the chip CP1. On the other hand, a group of the insulation elements 40A-2 and 40B-2, receiving circuits 50A and 50B, and output circuits 60A and 60B are arranged in the chip CP2.

The insulation elements 40A-1 and 40A-2 are mutually coupled in series between the signal generation circuit 30A and receiving circuit 50A, and the insulation elements 40B-1 and 40B-2 are mutually coupled in series between the signal generation circuit 30B and receiving circuit 50B. In other words, the insulation elements 40 of the chip CP1 and the insulation elements 40 of the chip CP2 are mutually coupled in series between the signal generation circuits 30 of the chip CP1 and the receiving circuits 50 of the chip CP2. The arrangement of two insulation elements 40 for each channel and in each of the chips CP1 and CP2 in the communication device 1 is referred to as double isolation.

[1-4-3] Third Modification Example of First Embodiment

Figure 10:
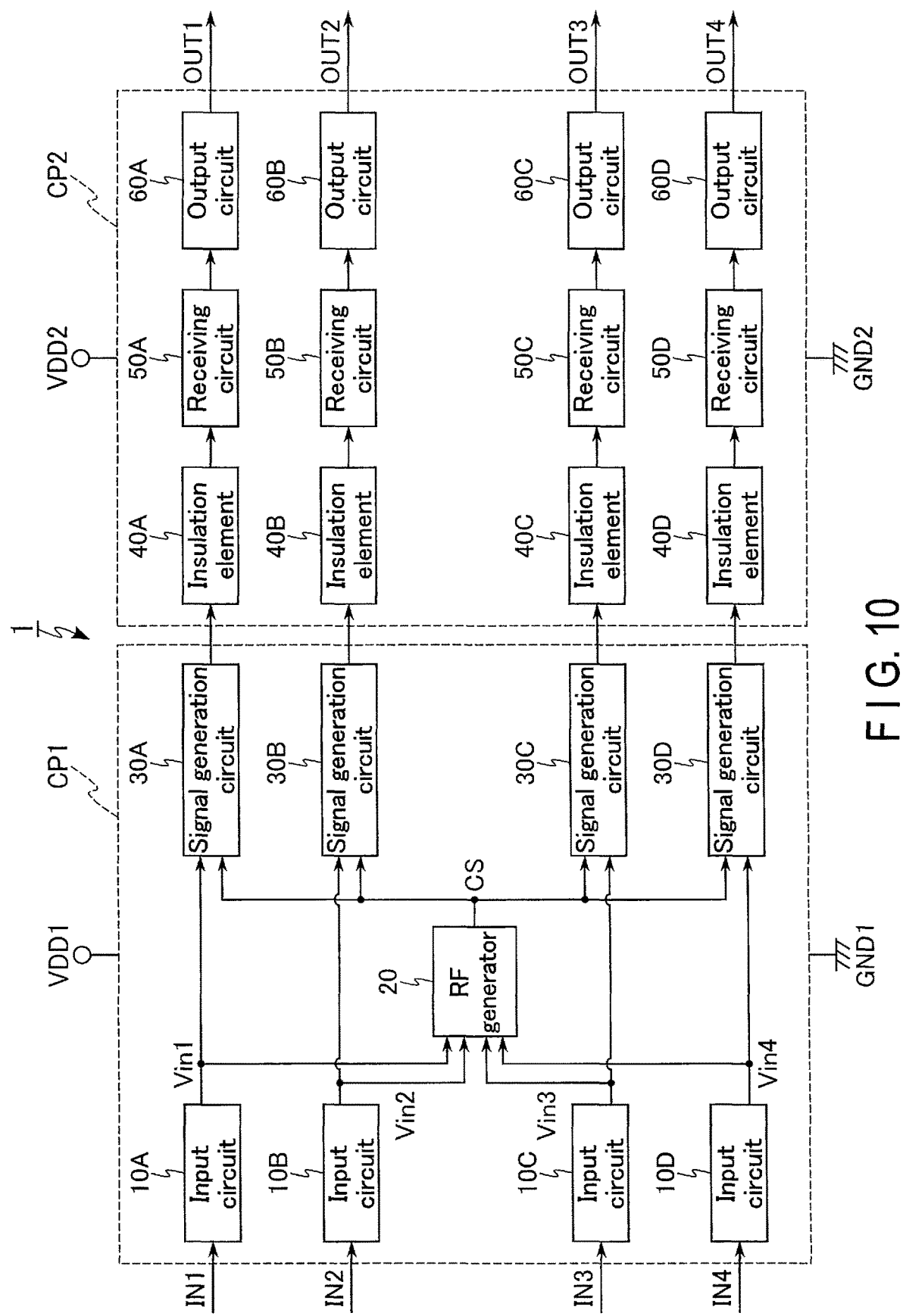
FIG. 10 is a block diagram showing an exemplary configuration of a communication device according to the third modification example of the first embodiment.

FIG. 10 shows an exemplary configuration of the communication device 1 according to the third modification example of the first embodiment. As illustrated in FIG. 10, in the communication device 1 according to the third modification example of the first embodiment, input circuits 10C and 10D, signal generation circuits 30C and 30D, insulation elements 40C and 40D, receiving circuits 50C and 50D, and output circuits 60C and 60D are newly added in comparison with the communication device 1 according to the first embodiment.

Input signals IN3 and IN4 are input from an external device to the input circuits 10C and 10D, respectively. The input circuits 10C and 10D respectively output input signal Vin3 and Vin4. The input signal Vin3 is input to the RF generator 20 and the signal generation circuit 30C. The input signal Vin4 is input to the RF generator 20 and the signal generation circuit 30D.

In the RF generator 20 according to the third modification example of the first embodiment, input signals Vin1, Vin2, Vin3, and Vin4 are input to the first input end, second input end, third input end, and fourth input end of the OR circuit 21, although they are not illustrated in the drawing. The RF generator 20 according to the third modification example of the first embodiment generates and outputs a carrier signal CS based on the input signals Vin1, Vin2, Vin3, and Vin4. The rest of the configuration and operation of the RF generator 20 according to the third modification example of the first embodiment is similar to that of the first embodiment.

The signal generation circuit 30C modulates the input signal Vin3, and outputs the signal to the insulation element 40C. The signal generation circuit 30D modulates the input signal Vin4, and outputs the signal to the insulation element 40D. The insulation element 40C transmits the electrical signal input from the signal generation circuit 30C to the receiving circuit 50C. The insulation element 40D transmits the electrical signal input from the signal generation circuit 30D to the receiving circuit 50D.

The receiving circuit 50C demodulates the electrical signal received from the insulation element 40C, and outputs the signal to the output circuit 60C. The receiving circuit 50D demodulates the electrical signal received from the insulation element 40D, and outputs the signal to the output circuit 60D. Based on the signal input from the receiving circuit 50C, the output circuit 60C outputs an output signal OUT3 to an external device. Based on the signal input from the receiving circuit 50D, the output circuit 60D outputs an output signal OUT4 to an external device. The rest of the structure of the communication device 1 according to the third modification example of the first embodiment is similar to that of the first embodiment.

As described above, the communication device 1 according to the third modification example of the first embodiment includes four groups (channels) of the input circuits 10, signal generation circuits 30, insulation elements 40, receiving circuits 50, and output circuits 60, and also includes a single RF generator 20 shared by the signal generation circuits 30 of these channels. The RF generator 20 according to the first embodiment may be shared by four channels, or by the number N (where N is an integer larger than or equal to 3) of channels. By operating the RF generator 20 based on the OR signal of the number N of input signals, the communication device 1 can produce effects similar to the first embodiment.

[2] Second Embodiment

A communication device 2 according to the second embodiment has a structure in which a signal generation circuit 30 generates and outputs a differential signal. The explanation of the communication device 2 according to the second embodiment below will focus on the points that differ from the first embodiment.

[2-1] Structure

FIG. 11 shows an exemplary circuit configuration of the signal generation circuit 30 in the communication device 2 according to the second embodiment. As illustrated in FIG. 11, in comparison with the signal generation circuit 30 according to the first embodiment, the signal generation circuit 30 according to the second embodiment has a configuration in which an inverter 315 and an AND circuit 316 are added to the signal generation part 31, the drive circuit 321 is omitted from the drive part 32, and transistors 322, 323, 324 and 325, and a current source 326 are added to the drive part 32.

The input end of the inverter 315 is coupled to the output end of the NAND circuit 313. The input signal Vin is input to the first input end of the AND circuit 316. The second input end of the AND circuit 316 is coupled to the output end of the inverter 315. The AND circuits 314 and 316 output modulated signals MS1 and MS2, respectively. The modulated signals MS1 and MS2 are complementary, establishing a relationship of, for example, a positive-phase signal and a negative-phase signal.

The transistors 322 and 323 may be P-type MOS transistors. A source voltage VDD1 is applied to the sources of the transistors 322 and 323. The gate of the transistor 322 is coupled to the output end of the AND circuit 316. The gate of the transistor 323 is coupled to the output end of the AND circuit 314.

The transistors 324 and 325 may be N-type MOS transistors. The drain of the transistor 324 is coupled to the drain of the transistor 322. The drain of the transistor 325 is coupled to the drain of the transistor 323. The gate of the transistor 324 is coupled to the output end of the AND circuit 316. The gate of the transistor 325 is coupled to the output end of the AND circuit 314.

The input end of the current source 326 is coupled to the sources of the transistors 324 and 325. The output end of the current source 326 is coupled to the ground GND1. In this manner, the current source 326 maintains the sum of the current passing via the transistors 322 and 324 and the current passing via the transistors 323 and 325 at a constant value.

In the above signal generation circuit 30 according to the second embodiment, an output current Iout1 is output from a node between the transistors 323 and 325, and an output current Iout2 is output from a node between the transistors 322 and 324. The output currents Iout1 and Iout2 correspond to a differential signal, and this differential signal is input to the insulation element 40.

That is, the signal generation part 31 of the signal generation circuit 30 outputs a differential output voltage based on the input signal Vin from the input circuit 10 and the carrier signal CS from the RF generator 20. The drive part 32 of the signal generation circuit 30 transmits this differential output voltage to the insulation element 40. According to the second embodiment, the drive part 32 of a current-limiting H-bridge type is adopted as a typical example of an insulation transformer driving part in the signal generation circuit 30.

FIG. 12 shows an exemplary circuit configuration of the insulation element 40 in the communication device 2 according to the second embodiment. As illustrated in FIG. 12, the insulation element 40 according to the second embodiment differs from the first embodiment in coupling of the coils 41 and 42 and the like.

Specifically, the output current Iout1 is supplied to one end of the coil 41 by the signal generation circuit 30 in the chip CP1, and the output current Iout2 is supplied to the other end of the coil 41 by the signal generation circuit 30 in the chip CP1. The one end and the other end of the coil 42 are both coupled to the receiving circuit 50.

In the above insulation element 40 according to the second embodiment, magnetic coupling is created between the coil 41 and coil 42 in the same manner as in the first embodiment. Specifically, when a current is input to such an insulation transformer, a magnetic field is generated. The direction of this magnetic field changes by switching the path in which a current flows with the transistors 323 and 324 of the signal generation circuit 30 in the ON state and the path in which a current flows with the transistors 322 and 325 of the signal generation circuit 30 in the ON state.

Thus, the voltages based on the output currents Iout1 and Iout2 supplied to the coil 41 are transmitted to the coil 42 through the magnetic coupling, and the transmitted voltages are applied to the receiving circuit 50. That is, the insulation element 40 transmits modulated signals to the receiving circuit 50 in accordance with electromagnetic induction between the coil 41 and coil 42 so that modulated signal can be applied to the receiving circuit 50. The receiving circuit 50 demodulates the modulated signal based on the voltages at one end and the other end of the coil 42, and outputs the voltage to the output circuit 60. The rest of the configuration of the communication device 2 according to the second embodiment is similar to that of the first embodiment.

[2-2] Operations

Figure 13:
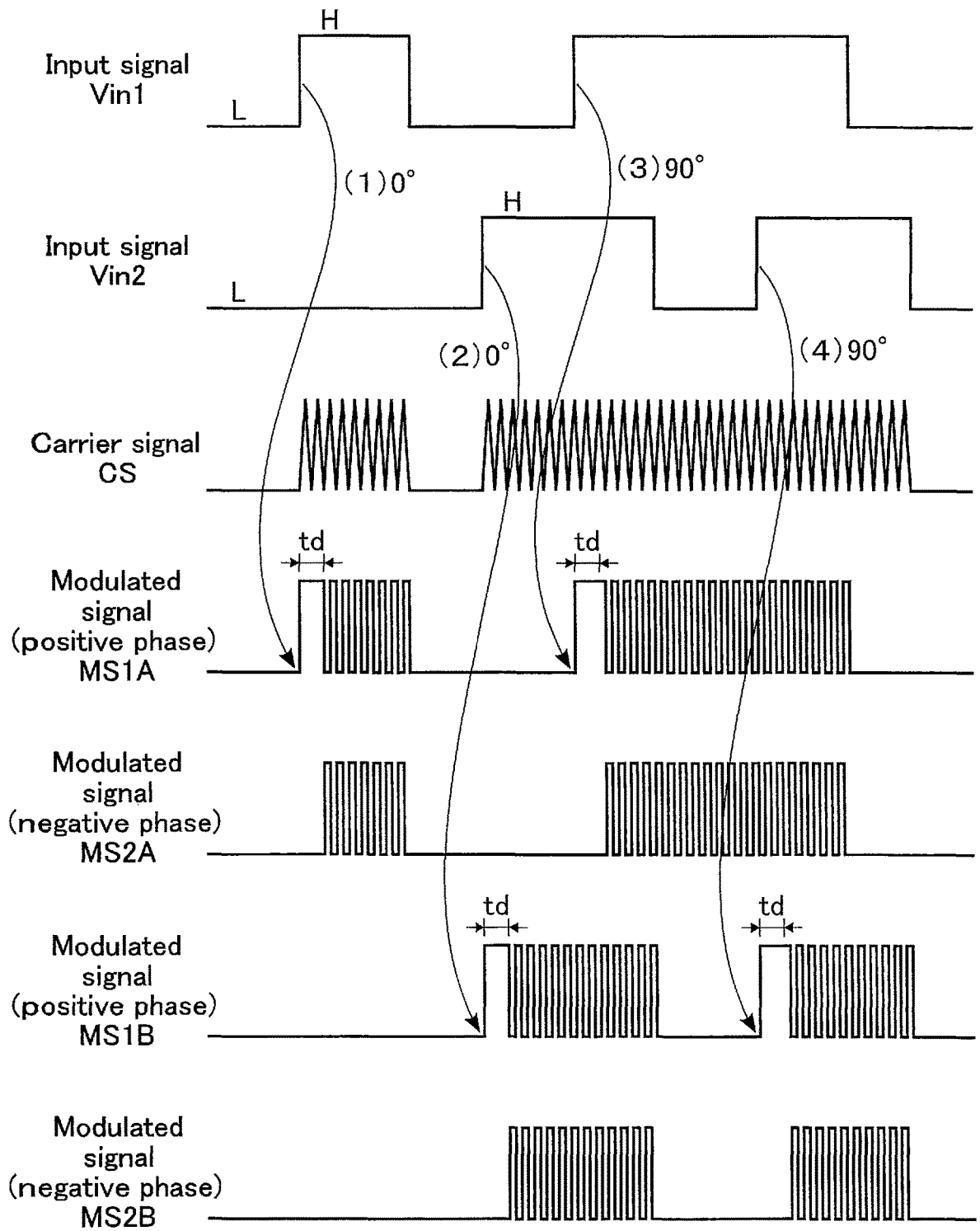
FIG. 13 is a timing chart of an exemplary operation on the communication device according to the second embodiment.

FIG. 13 shows an exemplary timing chart of the operation of the communication device 2 according to the second embodiment, where the input signals Vin1 and Vin2 turn to "H" level at the same timings as in FIG. 6. "MS1A" and "MS2A" represent the positive-phase modulated signal MS and negative-phase modulated signal MS, respectively, of the input signal Vin1. "MS1B" and "MS2B" represent the positive-phase modulated signal MS and negative-phase modulated signal MS, respectively, of the input signal Vin2.

As illustrated in FIG. 13, according to the second embodiment, the positive-phase modulated signal MS1A of the input signal Vin1 and the positive-phase modulated signal MS1B of the input signal Vin2 change in a manner similar to the modulated signals MSA and MSB of the first embodiment. On the other hand, the negative-phase modulated signal MS2A of the input signal Vin1 and the negative-phase modulated signal MS2B of the input signal Vin2 are inversion signals of the modulated signals MS1A and MS1B, respectively.

In brief, the AND circuit 314 corresponding to the positive phase operates in a manner similar to the AND circuit 314 according to the first embodiment. An input signal Vin is input to the first input end of the AND circuit 316 corresponding to the negative phase, while a signal obtained by inverting the output of the NAND circuit 313 by the inverter 315 is input to the second input end of the AND circuit 316. This means that the similar signal is input to the first input end of the AND circuit 314 and the first input end of the AND circuit 316. On the other hand, an inversion signal of the signal input to the second input end of the AND circuit 314 is input to the second input end of the AND circuit 316. As a result, the AND circuit 316 outputs the inversion signal of the AND circuit 314.

Furthermore, in the communication device 2 according to the second embodiment, when the input signal Vin is at "L" level, each of the AND circuits 314 and 316 outputs a signal at "L" level. In response, the current path between the power source and ground is shut off at the drive part 32 of the signal generation circuit 30. Then, the drive part 32 of the signal generation circuit 30 stops applying a voltage to the insulation element 40. The rest of the operation of the communication device 2 according to the second embodiment is similar to that of the first embodiment.

[2-3] Effects of Second Embodiment

The insulation element 40 that is driven by an H-bridge circuit in the communication device 2 according to the second embodiment has to use a differential signal. When the input signal Vin is at "L" level, however, the application of a current to the insulation element 40 would unfavorably increase power consumption and generate noise.

In contrast, the communication device 2 according to the second embodiment turns both the positive-phase voltage of the modulated signal (i.e., modulated signal MS1) and the negative-phase voltage of the modulated signal (i.e., modulated signal MS2) to "L" level when the input signal Vin is at "L" level. In this manner, the communication device 2 according to the second embodiment, in which the insulation element 40 is driven by an H-bridge circuit, can reduce power consumption and the amount of noise.

Furthermore, the communication device 2 according to the second embodiment can keep the waveform of the positive-phase modulated signal MS1 at the rising edge constant, regardless of whether the input signal Vin and the carrier signal CS are synchronous with each other, in the same manner as in the first embodiment. In addition, the modulated signal MS2 for driving the H-bridge circuit is an inversion signal of the modulated signal MS1, which means that this signal is at "L" level when the input signal Vin turns to "H" level. Thus, amount of noise can be suppressed at the modulated signal MS2 also. The communication device 2 according to the second embodiment therefore can suppress jitters in the output signals of the signal generation circuit 30, enhancing the operational stability.

[2-4] Modification Examples of Second Embodiment

Various modifications can be made to the communication device 2 according to the second embodiment. For instance, the signal generation circuit 30 may have a circuit configuration in which, when the input signal Vin is at "L" level, the modulated signals MS1 and MS2 are at "H" level. In such a configuration, the AND circuits 314 and 316 are both replaced with NAND circuits. The communication device 2 having this configuration can also achieve the similar effects as the second embodiment.

In addition, the communication device 2 according to the second embodiment may be combined with the third modification of the first embodiment. FIG. 14 shows an exemplary circuit configuration of the insulation element 40 in the communication device 2 according to a modification example of the second embodiment. As illustrated in FIG. 14, in this insulation element 40 according to the modification example of the second embodiment, the coils 41 and 42 according to the second embodiment are replaced with capacitors 43 and 44.

Specifically, an output current Iout1 is supplied to one electrode of the capacitor 43 by the signal generation circuit 30 in the chip CP1. The other electrode of the capacitor 43 is coupled to one end of the receiving circuit 50. An output current Iout2 is supplied to one electrode of the capacitor 44 by the signal generation circuit 30 in the chip CP1. The other electrode of the capacitor 44 is coupled to the other end of the receiving circuit 50. Here, each of an insulator between one electrode and the other electrode of the capacitor 43 and an insulator between one electrode and the other electrode of the capacitor 44 corresponds to an insulation layer ISO.

In the insulation element 40 according to the modification example of the second embodiment, electric field coupling is formed between one electrode and the other electrode of the capacitor 43, and between one electrode and the other electrode of the capacitor 44. Thus, a voltage based on the output current Iout1 supplied to one electrode of the capacitor 43 is transmitted to the other electrode of the capacitor 43 through electric field coupling so that the transmitted output voltage Vout can be applied to one end of the receiving circuit 50. Similarly, a voltage based on the output current Iout2 supplied to one electrode of the capacitor 44 is transmitted to the other electrode of the capacitor 44 through the electric field coupling so that the transmitted output voltage Vout can be applied to the other end of the receiving circuit 50.

As described above, the insulation element 40 in the communication device 2 according to the second embodiment may be an insulation capacitance instead of an insulation transformer. The communication device 2 incorporating an insulation capacitance as the insulation element 40 can achieve effects similar to the second embodiment. The above circuit configuration of the insulation element 40 is explained as a mere example. The insulation element 40 may have a different circuit configuration as long as the output currents Iout1 and Iout2 can be transmitted through the electric field coupling.

FIG. 15 shows an exemplary circuit configuration of the signal generation circuit 30 of the communication device 2 according to the modification of the second embodiment. As illustrated in FIG. 15, the signal generation circuit 30 according to the modification of the second embodiment, in which the insulation element 40 employs capacitance coupling, has a configuration with the current source 326 omitted from the signal generation circuit 30 according to the second embodiment. Specifically, the sources of the transistors 324 and 325 are both coupled to the ground GND1.

When an insulation capacitance is adopted as an insulation device, an inverter circuit has to be used for the drive part 32 of the signal generation circuit 30. The insulation capacitances (capacitors 43 and 44) in the insulation element 40 are therefore driven by the voltage of the inverter circuit. The rest of the configuration and operation of the communication device 2 according to the modification of the second embodiment is similar to that of the second embodiment. In this manner, the communication device 2 according to the modification of the second embodiment can achieve the similar effects as in the second embodiment.

[3] Third Embodiment

A communication device 3 according to the third embodiment includes an RF generator 20 having a configuration for generating and outputting multiple types of carrier signals CS. The explanation below of the communication device 3 according to the third embodiment will focus on points that differ from the first and second embodiments.

[3-1] Configuration

FIG. 16 shows an exemplary configuration of the communication device 3 according to the third embodiment. As illustrated in FIG. 16, the communication device 3 according to the third embodiment includes four channels in the same manner in the third modification example of the first embodiment. The communication device 3 according to the third embodiment differs from the third modification example of the first embodiment in the RF generator 20 configured to output four different types of carrier signals CS.

Specifically, the RF generator 20 according to the third embodiment generates and outputs carrier signals CS1, CS2, CS3, and CS4, based on the input signal Vin1 input from the input circuit 10A, the input signal Vin2 input from the input circuit 10B, the input signal Vin3 input from the input circuit 10C, and the input signal Vin4 input from the input circuit 10D. The carrier signals CS1, CS2, CS3, and CS4 are input to the signal generation circuits 30A, 30B, 30C, and 30D, respectively.

Figure 17:
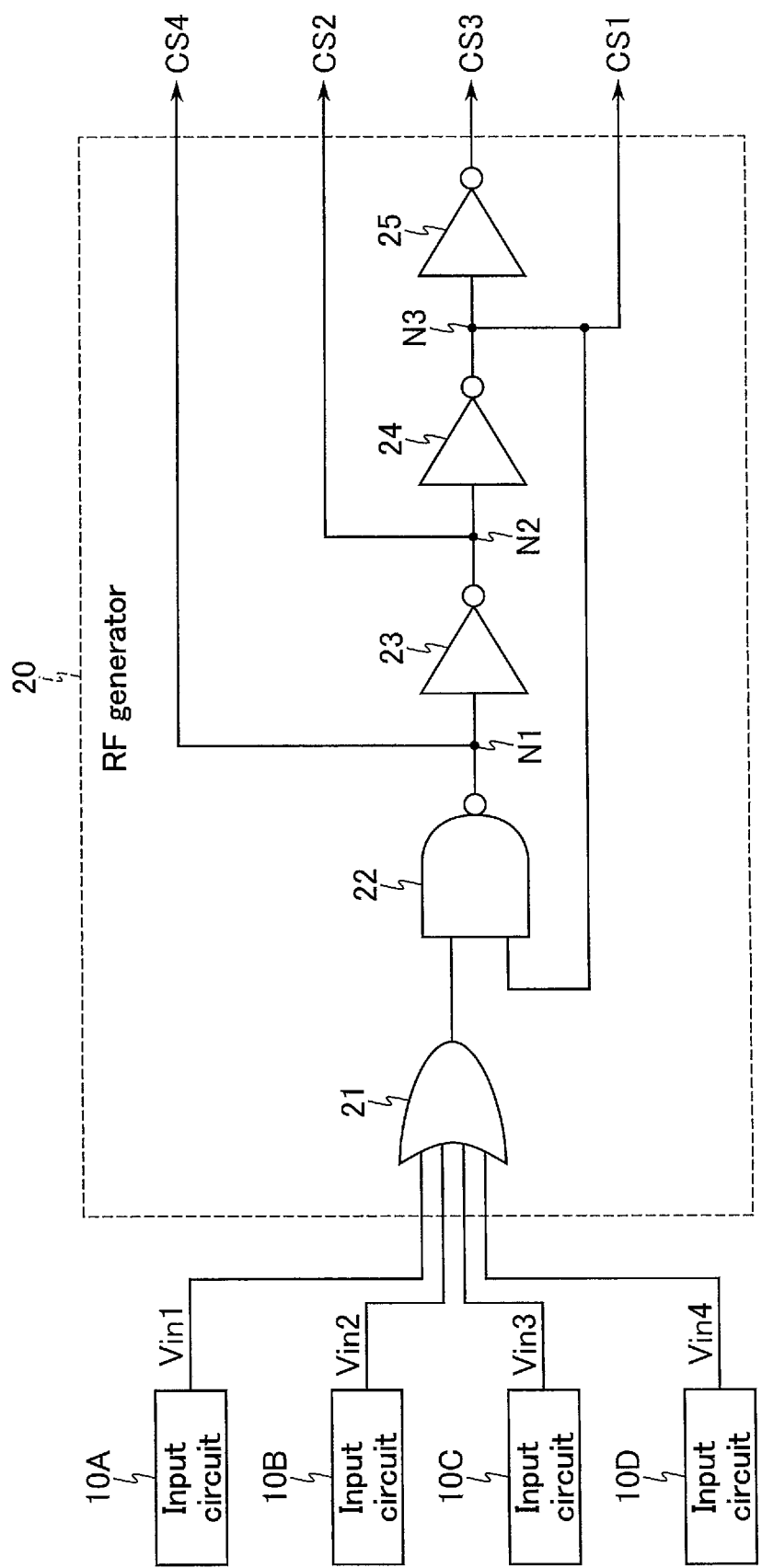
FIG. 17 is a circuit diagram showing an exemplary circuit configuration of an RF generator in a communication device according to the first modification example of the third embodiment.

FIG. 17 shows an exemplary circuit configuration of the RF generator 20 in the communication device 3 according to the third embodiment. As illustrated in FIG. 17, the signal output from the node N1 corresponds, for example, to the carrier signal CS4. The signal output from the node N2 corresponds to the carrier signal CS2. The signal output from the node N3 corresponds to the carrier signal CS1. The signal output from the inverter 25 corresponds to the carrier signal CS3.

In the above RF generator 20, the carrier signals CS1 to CS4 have phases that differ from each other. According to the third embodiment, the correspondence between the carrier signals CS and the nodes N1, N2, and N3 and the output end of the inverter may be freely changed. The rest of the configuration of the communication device 3 according to the third embodiment is similar to the third modification example of the first embodiment.

[3-2] Effects of Third Embodiment

In the communication device to which an N-bit signal can be input, the number N of signal generation circuits 30 are activated in synchronization, and a carrier signal flows in synchronization with the number N of insulation elements 40. This means that N-time greater EMI is radiated from the signal generation circuits 30 and insulation elements 40. According to the first and second embodiments, signals (pulses) output by the different signal generation circuits 30 are brought into precise synchronization with the carrier signal CS. In order to improve the performance against the EMI, the phases of the modulated signals of the carrier signal driven between the insulation elements 40 may be changed.

The communication device 3 according to the third embodiment includes an RF generator 20 that can generate multiple types of carrier signals CS. In brief, the RF generator 20 according to the third embodiment fetches four different types of carrier signals CS1 to CS4 from four different nodes of the nodes coupled to any of the serially coupled inverters 23 to 25. The signal generation circuits 30A, 30B, 30C, and 30D use the corresponding one of the carrier signals CS1, CS2, CS3, and CS4 to modulate the input signal Vin and thereby drive the corresponding insulation element 40.

Here, the carrier signal flowing into an insulation element x (corresponding to the insulation element 40, where x is an integer of 1 to 4) will be denoted as $Ax*\sin(\omega_0*t+\varphi x)$. The EMI signals from the four insulation elements can be expressed as in (1) below. In this formula, $\omega_0$ corresponds to the oscillation angular frequency of the RF generator 20, and Ax corresponds to the half amplitude of a carrier signal flowing into the insulation element x.

[Formula 1]

$$A\sin(\omega t+\varphi) = A_1\sin(\omega_0 t+\varphi_1) + A_2\sin(\omega_0 t+\varphi_2) + A_3\sin(\omega_0 t+\varphi_3) + A_4\sin(\omega_0 t+\varphi_4) \quad (1)$$

In formula (1), when $\varphi_1=0[\text{rad}]$ is established, $\varphi_2=2\pi/3 [\text{rad}]$ $\varphi_3=\pi[\text{rad}]$, and $\varphi_4=4\pi/3 [\text{rad}]$ are established. Furthermore, the combined amplitude A in (1) can be expressed as in (2A), and phase $\varphi$ in (1) can be expressed as in (2B).

[Formula 2]

$$A = \sqrt{\begin{array}{l}(A_1\cos\varphi_1 + A_2\cos\varphi_2 + A_3\cos\varphi_3 + A_4\cos\varphi_4)^2 + \\ (A_1\sin\varphi_1 + A_2\sin\varphi_2 + A_3\sin\varphi_3 + A_4\sin\varphi_4)^2\end{array}} \quad (2A)$$

[Formula 3]

$$\varphi = \tan^{-1}\frac{A_1\sin\varphi_1 + A_2\sin\varphi_2 + A_3\sin\varphi_3 + A_4\sin\varphi_4}{A_1\cos\varphi_1 + A_2\cos\varphi_2 + A_3\cos\varphi_3 + A_4\cos\varphi_4} \quad (2B)$$

If $\varphi_1=0[\text{rad}]$, $\varphi_2=2\pi/3[\text{rad}]$, $\varphi_3=\pi[\text{rad}]$, and $\varphi_4=4\pi/3[\text{rad}]$ are established, the combined amplitude reaches a maximum A=2 when $A_1=0$ and $A_2=A_3=A_4=1$. On the other hand, if $\varphi_1=\varphi_2=\varphi_3=\varphi_4=0$ [rad] is established, the combined amplitude reaches a maximum A=4 when $A_1=A_2=A_3=A_4=1$. In comparison of these cases, the communication device 3 according to the third embodiment can reduce the combined amplitude A by half by setting $\varphi_1=0[\text{rad}]$, $\varphi_2=2\pi/3[\text{rad}]$, $\varphi_3=\pi[\text{rad}]$, and $\varphi_4=4\pi/3[\text{rad}]$ as a result of which EMI can be improved by 6 dB.

The same applies to the EMI prevention of the second harmonic. When the EMI of a harmonic is considered, formula (1) may be rewritten into formula (3A) below.

[Formula 4]

$$A\sin(\omega t + \varphi) = A_1\sin\left(\omega t + \omega\frac{\varphi_1}{\omega_0}\right) + A_2\sin\left(\omega t + \omega\frac{\varphi_2}{\omega_0}\right) + A_3\sin\left(\omega t + \omega\frac{\varphi_3}{\omega_0}\right) + A_4\sin\left(\omega t + \omega\frac{\varphi_4}{\omega_0}\right) \quad (3A)$$

That is, for a second harmonic, $\omega=2\omega_0$ is established. This means that the phase of the second harmonic is double the phase of the fundamental harmonic. When an Nth harmonic is considered where $\omega=n\omega_0$ is established, the carrier signal flowing into the insulation element x can be expressed as in (3B) below.

[Formula 5]

$$A\sin(n\omega_0 t + \varphi) = A_1\sin(n\omega_0 t + n\varphi_1) + A_2\sin(n\omega_0 t + n\varphi_2) + A_3\sin(n\omega_0 t + n\varphi_3) + A_4\sin(n\omega_0 t + n\varphi_4) \quad (3B)$$

The combined amplitude A in (3B) can be expressed as in (4A), and the phase $\varphi$ in (3B) can be expressed as in (4B).

[Formula 6]

$$A = \sqrt{\begin{array}{l}(A_1\cos n\varphi_1 + A_2\cos n\varphi_2 + A_3\cos n\varphi_3 + A_4\cos n\varphi_4)^2 + \\ (A_1\sin n\varphi_1 + A_2\sin n\varphi_2 + A_3\sin n\varphi_3 + A_4\sin n\varphi_4)^2\end{array}} \quad (4A)$$

[Formula 7]

$$\varphi = \tan^{-1}\frac{A_1\sin n\varphi_1 + A_2\sin n\varphi_2 + A_3\sin n\varphi_3 + A_4\sin n\varphi_4}{A_1\cos n\varphi_1 + A_2\cos n\varphi_2 + A_3\cos n\varphi_3 + A_4\cos n\varphi_4} \quad (4B)$$

If $\varphi_1=0[\text{rad}]$, $\varphi_2=2\pi/3[\text{rad}]$, $\varphi_3=\pi[\text{rad}]$, and $\varphi_4=4\pi/3[\text{rad}]$ are established, the combined amplitude reaches a maximum. A=2 when $A_1=A_3=1$ and $A_2=A_4=1$. On the other hand, if $\varphi_1=\varphi_2=\varphi_3+\varphi_4=0[\text{rad}]$ is established, the combined amplitude reaches a maximum A=4 when $A_1=A_2=A_3=A_4=1$. In comparison with these cases, in the same manner as in the fundamental harmonic, the communication device 3 according to the third embodiment can reduce the combined amplitude A by half by setting $\varphi_1=0[\text{rad}]$, $\varphi_2=2\pi/3[\text{rad}]$, $\varphi_3=\pi[\text{rad}]$, and $\varphi_4=4\pi/3[\text{rad}]$, and the EMI of the harmonic wave can be improved by 6 dB.

[3-3] Modification Example of Third Embodiment

Various modifications can be made to the above described communication device 3 according to the third embodiment. In the third embodiment, four carrier signals having different phases of $\varphi_1=0[\text{rad}]$, $\varphi_2=2\pi/3[\text{rad}]$, $\varphi_3=\pi[\text{rad}]$, and $\varphi_4=4\pi/3[\text{rad}]$ are used. This is not a limitation, however. The communication device 3 can equally improve the EMI of harmonics even when the number of types of carrier signals is any number other than four. The first and second modification examples of the third embodiment will be discussed below, focusing on the points that differ from the third embodiment.

[3-3-1] First Modification Example of Third Embodiment

FIG. 18 shows an exemplary configuration of the communication device 3 according to the first modification example of the third embodiment. As illustrated in FIG. 18, the communication device 3 according to the first modification example of the third embodiment differs from the third embodiment in that the RF generator 20 outputs three types of carrier signals CS.

Specifically, the RF generator 20 according to the first modification example of the third embodiment generates and outputs carrier signals CS1, CS2, and CS3 based on the input signal Vin1 input from the input circuit 10A, the input signal Vin2 input from the input circuit 10B, the input signal Vin3 input from the input circuit 10C, and the input signal Vin4 input from the input circuit 10D. For instance, the carrier signal CS1 may be input to the signal generation circuits 30A and 30B. The carrier signals CS2 and CS3 are input to the signal generation circuits 30C and 30D, respectively.

Figure 19:
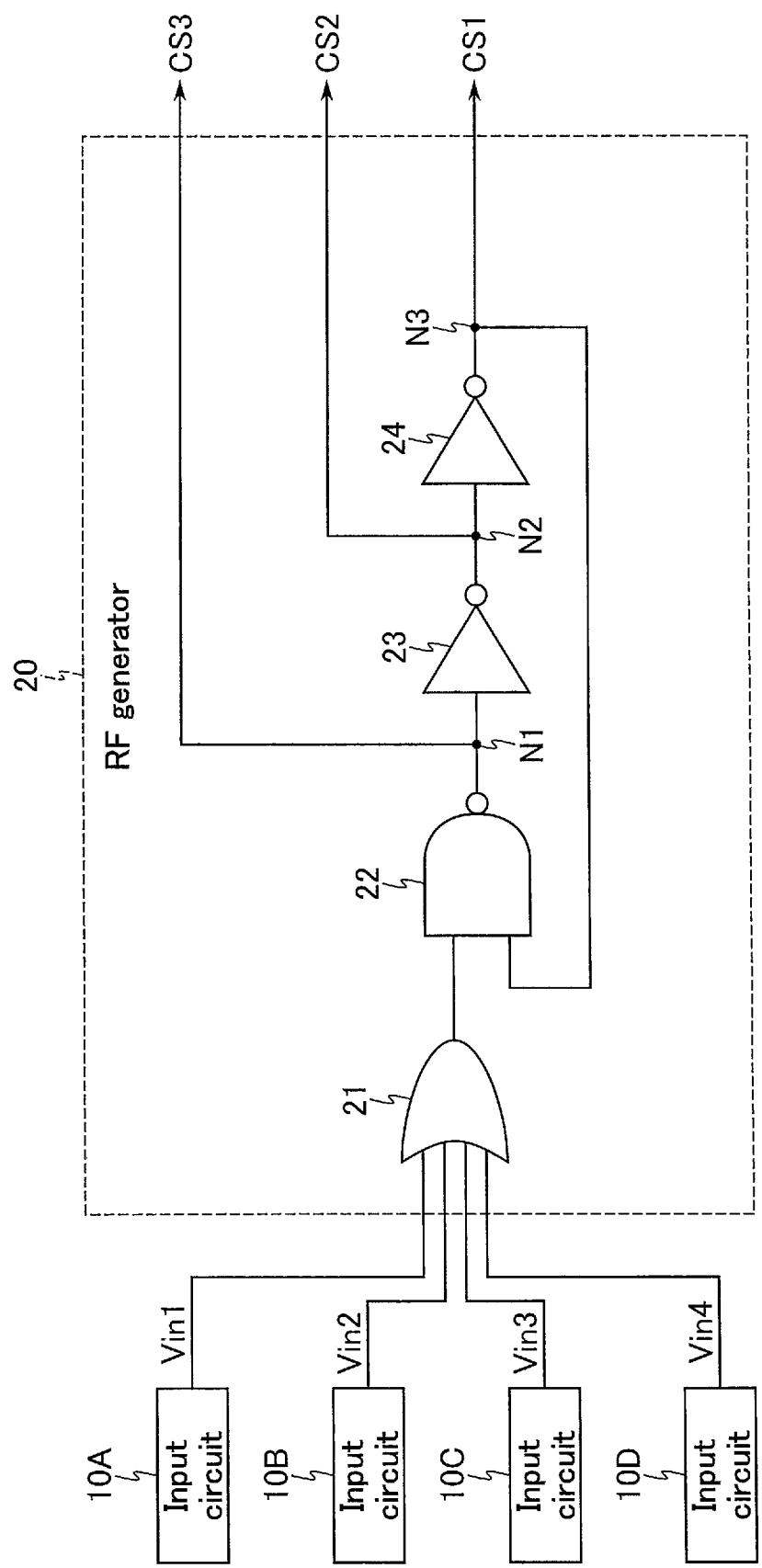
FIG. 19 is a circuit diagram showing an exemplary circuit configuration of an RF generator in a communication device according to the second modification example of the third embodiment.

FIG. 19 shows an exemplary circuit configuration of the RF generator 20 in the communication device 3 according to the first modification example of the third embodiment. As illustrated in FIG. 19, in the RF generator 20 according to the first modification example of the third embodiment, the inverter 25 is omitted from the RF generator 20 according to the first embodiment, and multiple carrier signals CS are output from multiple nodes.

Specifically, in the first modification example of the third embodiment, a signal output from the node N1 corresponds to the carrier signal CS3. The signal output from the node N2 corresponds to the carrier signal CS2. The signal output from the node N3 corresponds to the carrier signal CS1. In the first modification example of the third embodiment, the correspondence between the carrier signals CS and the nodes N1, N2, and N3 can be freely changed. The other configuration of the communication device 3 according to the first modification example of the third embodiment is similar to that of the third embodiment.

In the above communication device 3 according to the first modification example of the third embodiment, $\varphi_1=\varphi_2=0[rad]$, $\varphi_3=2\pi/3[rad]$, and $\varphi_4=4\pi/3[rad]$ are established. Thus, in the communication device 3 according to the first modification example of the third embodiment, the EMI performance of the fundamental harmonic and second harmonic can be improved by 6 dB in comparison with when $\varphi_1=\varphi_2=\varphi_3=\varphi_4=0[rad]$, in the same manner as in the third embodiment.

In the first modification example of the third embodiment, the carrier signal CS1 is input to the two signal generation circuits 30A and 30B. However, a carrier signal CS other than the carrier signal CS1 may be input to the two signal generation circuits 30A and 30B. If the carrier signal CS2 is to be input to the signal generation circuits 30A and 30B, $\varphi_1=0[rad]$, $\varphi_2=\varphi_3=2\pi/3[rad]$, and $\varphi_4=4\pi/3[rad]$ will be established. If the carrier signal CS3 is to be input to the signal generation circuits 30A and 30B, $\varphi_1=0[rad]$, $\varphi_2=2\pi/3[rad]$, and $\varphi_3=\varphi_4=4\pi/3[rad]$ will be established. In any case, the communication device 3 can improve the EMI performance of the fundamental harmonic and second harmonic by 6 dB, in the same manner as in the third embodiment.

[3-3-2] Second Modification Example of Third Embodiment

FIG. 20 shows an exemplary configuration of the communication device 3 according to the second modification example of the third embodiment. As illustrated in FIG. 20, the communication device 3 according to the second modification example of the third embodiment differs from the third embodiment in that the RF generator 20 outputs two different types of carrier signals CS.

Specifically, the RF generator 20 according to the second modification example of the third embodiment generates and outputs carrier signals CS1 and CS2 based on the input signal Vin1 input from the input circuit 10A, the input signal Vin2 input from the input circuit 10B, the input signal Vin3 input from the input circuit 10C, and the input signal Vin4 input from the input circuit 10D. For instance, the carrier signal CS1 may be input to the signal generation circuits 30A and 30B. The carrier signal CS2 may be input to the signal generation circuits 30C and 30D.

FIG. 21 shows an exemplary circuit configuration of the RF generator 20 in the communication device 3 according to the second modification example of the third embodiment. As illustrated in FIG. 21, in the configuration of the RF generator 20 according to the second modification example of the third embodiment, the output of a carrier signal CS from the node N2 is omitted from the RF generator 20 according to the first modification example of the third embodiment.

In the second modification example of the third embodiment, a signal from the node N1 may correspond to the carrier signal CS2, and the signal output from the node N3 may correspond to the carrier signal CS1. In the second modification example of the third embodiment, the correspondence between the carrier signals CS and the nodes N1 and N3 can be freely changed. The rest of the communication device 3 according to the second modification example of the third embodiment is similar to that of the first modification example of the third embodiment.

In the above communication device 3 according to the second modification example of the third embodiment, $\varphi_1=\varphi_2=0[rad]$ and $\varphi_3=\varphi_4=2\pi/3[rad]$ are established. Thus, in the communication device 3 according to the second modification example of the third embodiment, the EMI performance of the fundamental harmonic and second harmonic can be improved by 6 dB in comparison with when $\varphi_2=\varphi_2=\varphi_3=\varphi_4=0[rad]$, in the same manner as in the third embodiment.

[3-3-3] Third Modification Example of Third Embodiment

FIG. 22 shows an exemplary circuit configuration of the RF generator 20 in the communication device 3 according to the third modification example of the third embodiment. As illustrated in FIG. 22, in the configuration of the RF generator 20 according to the third modification example of the third embodiment, the output of a carrier signal CS from the node N1 is omitted from the RF generator 20 according to the first modification example of the third embodiment.

In the third modification example of the third embodiment, the signal output from the node N2 corresponds to the carrier signal CS2. The signal output from the node N3 corresponds to the carrier signal CS1. In the third modification example of the third embodiment, the correspondence between the carrier signals CS and the nodes N2 and N3 can be freely changed. The rest of the configuration of the communication device 3 according to the third modification example of the third embodiment is similar to that of the first modification example of the third embodiment.

In the above communication device 3 according to the third modification example of the third embodiment, $\varphi_1=\varphi_2=0$[rad] and $\varphi_3=\varphi_4=4\pi/3$[rad] are established. Thus, in the communication device 3 according to the third modification example of the third embodiment, the EMI performance of the fundamental harmonic and second harmonic can be improved by 6 dB in comparison with when $\varphi_3=\varphi_2=\varphi_3=\varphi_4=0$[rad], in the same manner as in the third embodiment.

[4] Fourth Embodiment

A communication device 4 according to the fourth embodiment presents a modification example of the signal generation circuit 30 utilizing positive-phase and negative-phase modulated signals as explained in the second embodiment. The communication device 4 according to the fourth embodiment will be explained below, focusing on points that differ from the second embodiment.

[4-1] Configuration

FIG. 23 shows an exemplary circuit configuration of the signal generation circuit 30 in the communication device 4 according to the fourth embodiment. As illustrated in FIG. 23, the signal generation circuit 30 according to the fourth embodiment includes a signal generation part 31 having a circuit configuration that differs from that of the second embodiment. The signal generation part 31 according to the fourth embodiment may include a first delay circuit 330, a second delay circuit 331, a clock transition detection circuit 332, a pulse generation circuit 333, a NAND circuit 334, a phase detection circuit 335, a selector circuit 336, an OR circuit 337, and a NOR circuit 338.

An input signal Vin is input to the first delay circuit 330. Then, the first delay circuit 330 inputs the delayed input signal Vin to the pulse generation circuit 333. The delay amount of the first delay circuit 330 may be set to the same amount of delay of a signal sent via the clock transition detection circuit 332. Hereinafter, the input signal Vin delayed by the first delay circuit 330 will be referred to as a delayed input signal VinD.

A carrier signal CS is input to the second delay circuit 331. The second delay circuit 331 inputs the delayed carrier signal CS to the selector circuit 336. The delay amount of the second delay circuit 331 may be set to the sum of the delay amount of a signal sent via the clock transition detection circuit 332 and the delay amount of a signal sent via the phase detection circuit 335. Hereinafter, the carrier signal CS delayed by the second delay circuit 331 will be referred to as a delayed carrier signal CSd.

The clock transition detection circuit 332, to which an input signal Vin and a carrier signal CS are input, generates clock transition signals CT1 and CT2 based on the received input signal Vin and carrier signal CS. Thereafter, the clock transition detection circuit 332 inputs the generated clock transition signals CT1 and CT2 to each of the pulse generation circuit 333, NAND circuit 334, and phase detection circuit 335.

Based on the received delayed input signal VinD and clock transition signals CT1 and CT2, the pulse generation circuit 333 generates a positive-phase input signal VinNP. The pulse generation circuit 333 inputs the generated positive-phase input signal VinNP to the OR circuit 337.

The NAND circuit 334 executes a NAND operation upon the input clock transition signals CT1 and CT2. The NAND circuit 334 inputs the result of the operation as a negative-phase input signal VinRP to the NOR circuit 338.

Based on the clock transition signals CT1 and CT2, the phase detection circuit 335 generates phase detection signals PD1 and PD2. The phase detection circuit 335 inputs the generated phase detection signals PD1 and PD2 to the selector circuit 336.

The selector circuit 336 generates an internal carrier signal Vcs based on the input phase detection signals PD1 and PD2 and the delayed carrier signal CSd. Thereafter, the selector circuit 336 inputs the generated internal carrier signal Vcs to the OR circuit 337 and NOR circuit 338.

The OR circuit 337 corresponds to the positive-phase output of the signal generation circuit 30. Specifically, the OR circuit 337 executes an OR operation upon the positive-phase input signal VinNP and internal carrier signal Vcs. The OR circuit 337 outputs the result of the operation as a positive-phase modulated signal MS1 to the drive part 32.

The NOR circuit 338 corresponds to the negative-phase output of the signal generation circuit 30. Specifically, the NOR circuit 338 executes a NOR operation upon the received negative-phase input signal VinRP and internal carrier signal Vcs. The NOR circuit 338 outputs the result of the operation as a negative-phase modulated signal MS2 to the drive part 32.

The rest of the configuration of the communication device 4 according to the fourth embodiment is similar to that of the second embodiment. That is, the modulated signals MS1 and MS2 generated by the signal generation part 31 are input to the drive part 32. Then, the drive part 32 amplifies the differential between the modulated signals MS1 and MS2, and outputs the amplified voltage to the insulation element 40. The signal generation circuit 30 according to the fourth embodiment may have a different circuit configuration as long as it can realize the operations described below.

[4-2] Operations

The operation of the communication device 4 according to the fourth embodiment could vary depending on the state of the RF generator 20 and the rising timing of the input signal Vin. Exemplary operations of the communication device 4 according to the fourth embodiment will be explained with reference to FIGS. 24 to 26. These drawings show timing charts of exemplary operations of the communication device 4 according to the fourth embodiment, illustrating the voltages of the signals in a signal generation circuit 30.

In the following explanation, the RF generator 20 being in an ON state means that at least one of the input signals Vin corresponding to other signal generation circuits 30 has risen, with the carrier signal CS already being oscillated. On the other hand, if the RF generator 20 is in an OFF state, all the input signals Vin corresponding to other signal generation circuits 30 are in an OFF state, which indicates that the carrier signal CS is not in an oscillated state.

The initial voltages of the input signal Vin, delayed input signal VinD, clock transition signals CT1 and CT2, phase detection signals PD1 and PD2, internal carrier signal Vcs, and positive-phase input signal VinNP are set to "L" level. Here, the NAND circuit 334 outputs the negative-phase input signal VinRP at "H" level. The OR circuit 337 outputs the modulated signal MS1 at "L" level. The NOR circuit 338 outputs the modulated signal MS2 at "L" level.

(Rise of Vin with RF Generator 20 being ON and CS being at "L" Level)

Figure 24:
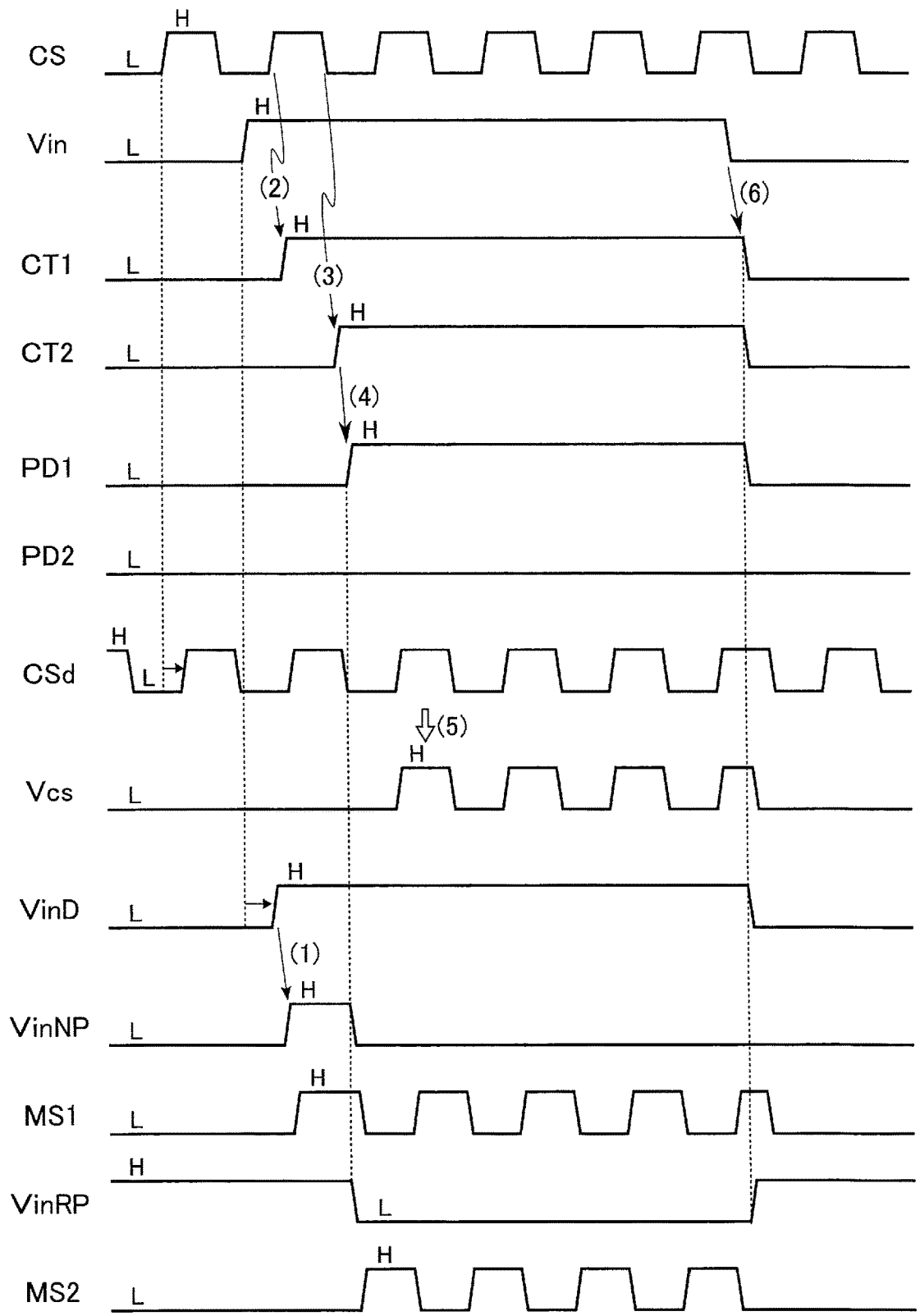
FIG. 24 is a timing chart of a first exemplary operation on the communication device according to the fourth embodiment.

FIG. 24 is a timing chart of a first exemplary operation on the communication device according to the fourth embodiment. FIG. 24 shows the operation when the input signal Vin rises with the RF generator 20 being in the ON state and the carrier signal CS being at "L" level (RF: ON; "L"→"H" detected). As illustrated in FIG. 24, in the initial state, the carrier signal CS is oscillating, and the delayed carrier signal CSd is oscillating with a delay with respect to the carrier signal CS.

When the input signal Vin rises, the first delay circuit 330 generates a delayed input signal VinD by delaying the input signal Vin, and thereby transitions the delayed input signal VinD from "L" level to "H" level ((1) in FIG. 24). Responsive to the delayed input signal VinD turned to "H" level, the pulse generation circuit 333 transitions the positive-phase input signal VinNP from "L" level to "H" level. The positive-phase input signal VinNP at "H" level is thereby input to the OR circuit 337, which turns the modulated signal MS1 to "H" level.

When the input signal Vin rises, the clock transition detection circuit 332 starts tracking the state of the carrier signal CS. Here, the clock transition detection circuit 332 first transitions the clock transition signal CT1 from "L" level to "H" level, responsive to the rise of the carrier signal CS ((2) in FIG. 24). Thereafter, responsive to the fall of the carrier signal CS, the clock transition detection circuit 332 transitions the clock transition signal CT2 from "L" level to "H" level ((3) in FIG. 24). When the clock transition signals CT1 and CT2 are both at "H" level, the pulse generation circuit 333 turns the positive-phase input signal VinNP from "H" level to "L" level, while the NAND circuit 334 turns the negative-phase input signal VinRP from "H" level to "L" level. Based on the transition of the clock transition signal CT2 to "H" level that has occurred after the transition of the clock transition signal CT1, the phase detection circuit 335 transitions the phase detection signal PD1 from "L" level to "H" level ((4) in FIG. 24). In other words, based on the transition of the clock transition signal CT1 to "H" level that has occurred prior to the transition of the clock transition signal CT2, the phase detection circuit 335 transitions the phase detection signal PD1 from "L" level to "H" level.

Based on the phase detection signal PD1 being at "H" level, the selector circuit 336 outputs as an internal carrier signal Vcs a signal having the same phase as that of the delayed carrier signal CSd ((5) in FIG. 24). When a positive-phase input signal VinNP of "L" level is input to the OR circuit 337, the OR circuit 337 switches the modulated signal MS1 to "L" level, and then outputs a modulated signal MS1 having the phase of the internal carrier signal Vcs maintained. When the negative-phase input signal VinRP of the "L" level is input to the NOR circuit 338, the NOR circuit 338 outputs a modulated signal MS2 having an inverted phase of the phase of the internal carrier signal Vcs.

As described above, in this example, as soon as the input signal Vin rises, the first pulse signal of the modulated signal MS1 is generated by the pulse generation circuit 333, and the subsequent pulse signals are generated based on the internal carrier signal Vcs having the same phase as that of the carrier signal CS. Thereafter, when the input signal Vin falls, the first delay circuit 330 transitions the delayed input signal VinD from "H" level to "L" level, and the clock transition detection circuit 332 transitions the clock transition signals CT1 and CT2 from "H" level to "L" level ((6) in FIG. 24). Based on both the clock transition signals CT1 and CT2 being at "L" level, the NAND circuit 334 outputs the negative-phase input signal VoutRP at "H" level; the phase detection circuit 335 transitions the phase detection signal PD1 from "H" level to "L" level; and the selector circuit 336 maintains the internal carrier signal Vcs at "L" level. As a result, the signal generation circuit 30 returns to the initial state.

(Rise of Vin with RF Generator 20 being ON and CS being at "H" Level)

Figure 25:
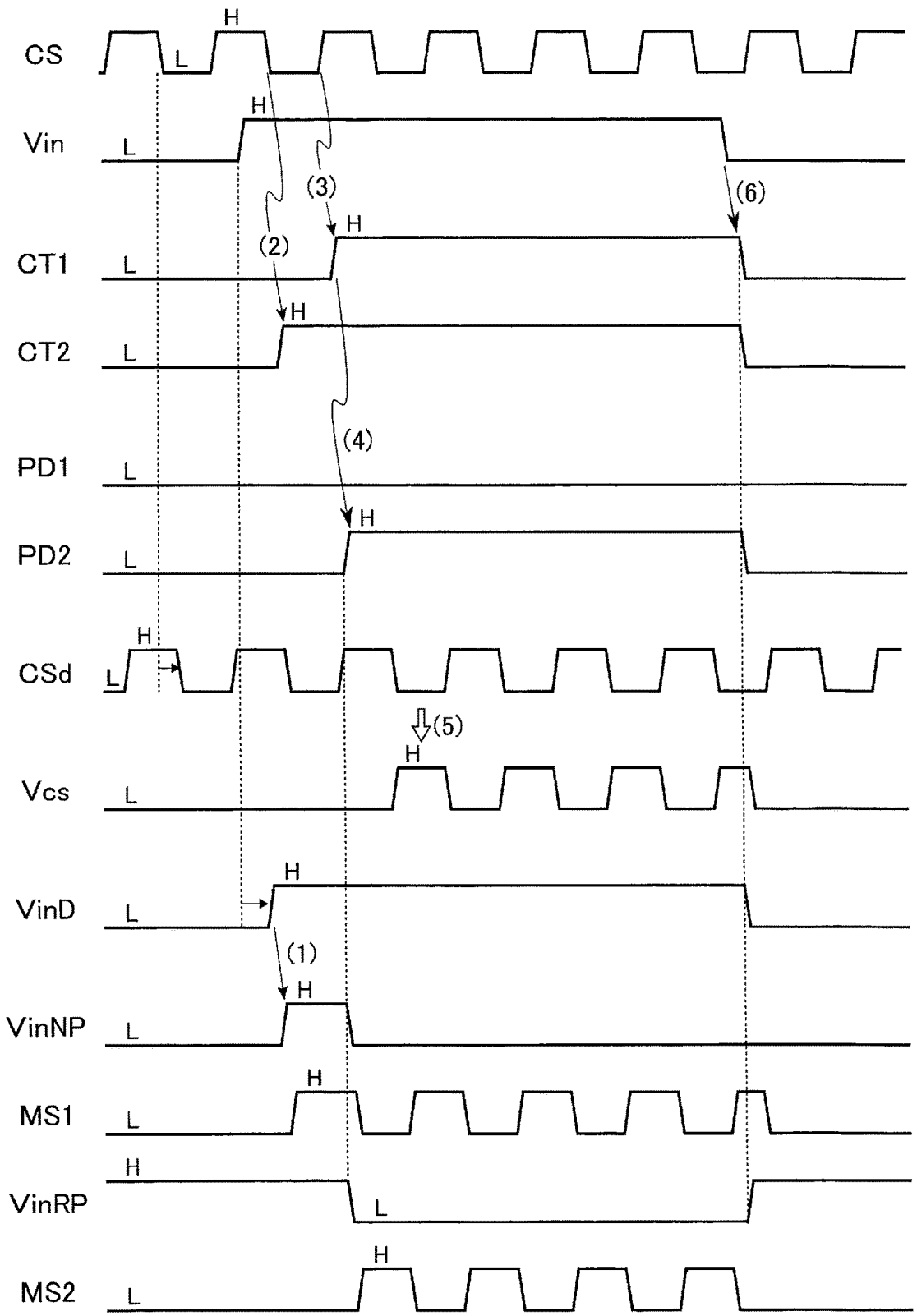
FIG. 25 is a timing chart of a second exemplary operation on the communication device according to the fourth embodiment.

FIG. 25 is a timing chart of a second exemplary operation on the communication device according to the fourth embodiment. FIG. 25 corresponds to the operation when the input signal Vin rises with the RF generator 20 being in the ON state and the carrier signal CS being at "H" level (RF: ON; detection of "H"→"L"). As illustrated in FIG. 25, in the initial state, the carrier signal CS is oscillating, and the delayed carrier signal CSd is oscillating with a delay with respect to the carrier signal CS.

When the input signal Vin rises, the first delay circuit 330 delays the delayed input signal VinD with respect to the input signal Vin, and thereby transitions the delayed input signal VinD from "L" level to "H" level ((1) in FIG. 25). Responsive to the delayed input signal VinD turned to "H" level, the pulse generation circuit 333 transitions the positive-phase input signal VinNP from "L" level to "H" level. The positive-phase input signal VinNP at "H" level is thereby input to the OR circuit 337, which turns the modulated signal MS1 to "H" level.

When the input signal Vin rises, the clock transition detection circuit 332 starts tracking the state of the carrier signal CS. Here, based on the fall of the carrier signal CS, the clock transition detection circuit 332 first transitions the clock transition signal CT2 from "L" level to "H" level ((2) in FIG. 25). Thereafter, based on the rise of the carrier signal CS, the clock transition detection circuit 332 turns the clock transition signal CT1 from "L" level to "H" level ((3) in FIG. 25). When the clock transition signals CT1 and CT2 are both at "H" level, the pulse generation circuit 333 turns the positive-phase input signal VinNP from "H" level to "L" level, and the NAND circuit 334 turns the negative-phase input signal VinRP from "H" level to "L" level. Based on the transition of the clock transition signal CT1 to "H" level that has occurred after the transition of the clock transition signal CT2, the phase detection circuit 335 transitions the phase detection signal PD2 from "L" level to "H" level ((4) in FIG. 25). In other words, based on the transition of the clock transition signal CT2 to "H" level that has occurred prior to the transition of the clock transition signal CT1, the phase detection circuit 335 transitions the phase detection signal PD2 from "L" level to "H" level.

Based on the phase detection signal PD2 being at "H" level, the selector circuit 336 outputs as an internal carrier signal Vcs a signal having an inverted phase of the phase of the delayed carrier signal CSd ((5) in FIG. 25). When the positive-phase input signal VinNP of "L" level is input to the OR circuit 337, the OR circuit 337 turns the modulated signal MS1 to "L" level, and then outputs a modulated signal MS1 having the same phase as that of the internal carrier signal Vcs. When the negative-phase input signal VinRP of the "L" level is input to the NOR circuit 338, the NOR circuit 338 outputs a modulated signal MS2 having an inverted phase of the phase of the internal carrier signal Vcs.

As described above, in the above exemplary operation, as soon as the input signal Vin rises, the first pulse signal of the modulated signal MS1 is generated by the pulse generation circuit 333, and the second and subsequent pulse signals are generated based on the internal carrier signal Vcs corresponding to the inverted output of the carrier signal CS. Thereafter, when the input signal Vin falls, the first delay circuit 330 turns the delayed input signal VinD from "H" level to "L" level, and the clock transition detection circuit 332 turns the clock transition signals CT1 and CT2 from "H" level to "L" level ((6) in FIG. 25). Based on both the clock transition signals CT1 and CT2 being at "L" level, the NAND circuit 334 outputs the negative-phase input signal VinRP at "H" level; the phase detection circuit 335 transitions the phase detection signal PD2 from "H" level to "L" level; and the selector circuit 336 maintains the internal carrier signal Vcs at "L" level. As a result, the signal generation circuit 30 returns to the initial state.

(Rise of Vin with RF Generator 20 being OFF)

Figure 26:
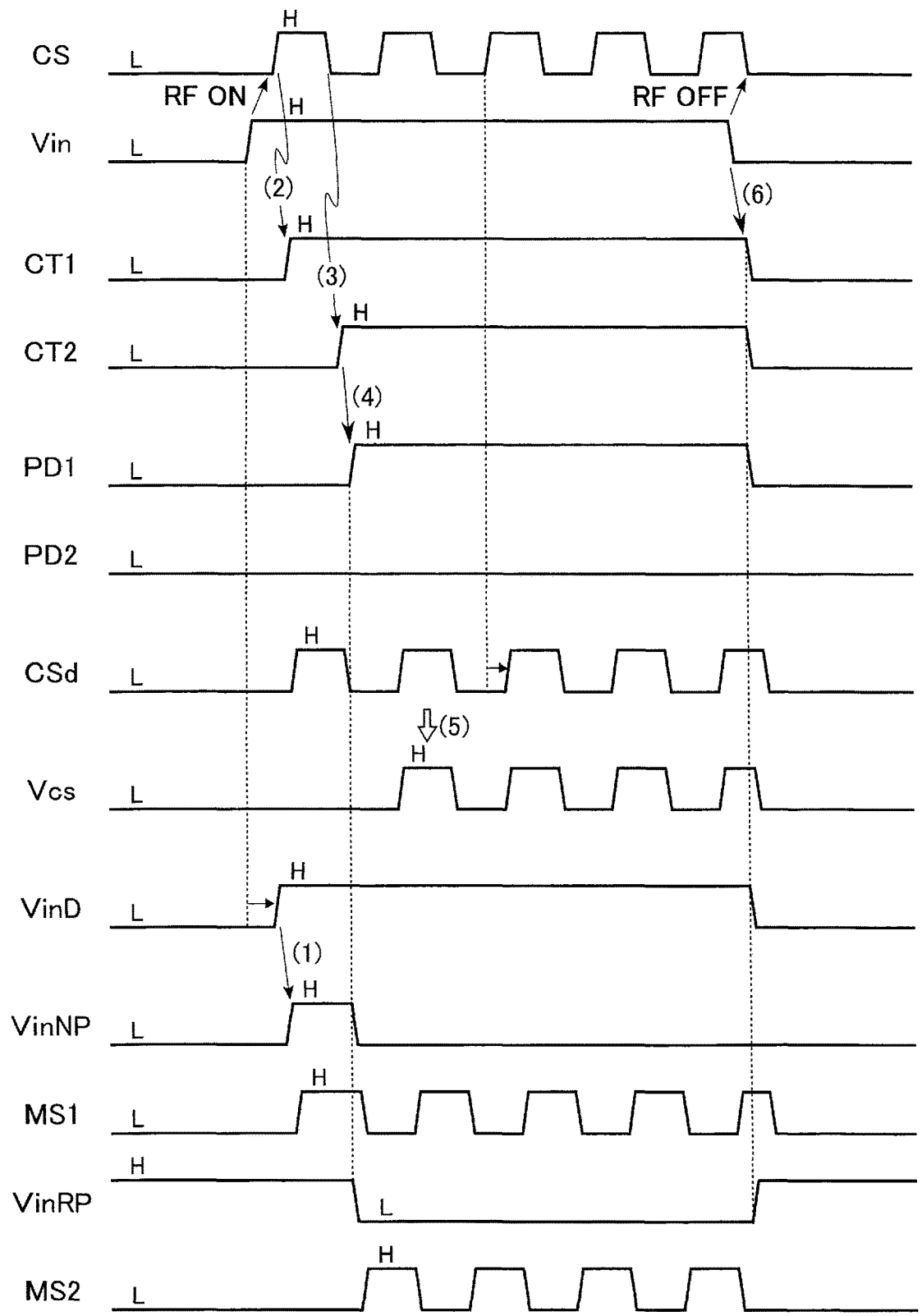
FIG. 26 is a timing chart of a third exemplary operation on the communication device according to the fourth embodiment.

FIG. 26 is a timing chart of a third exemplary operation on the communication device according to the fourth embodiment. FIG. 26 corresponds to the operation when the input signal Vin rises with the RF generator 20 being in the OFF state (RF: OFF→ON). As illustrated in FIG. 26, in the initial state of this example, the carrier signal CS is in the OFF state ("L" level).

In response to the rise of the input signal Vin, the RF generator 20 is turned ON, which starts the oscillation of the carrier signal CS (RF ON). In this case, the clock transition detection circuit 332 detects the rise of the carrier signal CS first, and then detects the fall of the carrier signal CS. That is, in this example, after the rise of the input signal Vin, the clock transition signal CT1 is turned to "H" level, and then the clock transition signal CT2 is turned to "H" level. The other operation illustrated in FIG. 26 is similar to that of FIG. 24. If any other input signal Vin maintains "L" level, the RF generator 20 is turned OFF when the input signal Vin falls (RF OFF).

[4-3] Effects of Fourth Embodiment

As described above, the signal generation circuit 30 in the communication device 4 according to the fourth embodiment includes a signal generation part 31 that changes the phase of the internal carrier signal Vcs in accordance with the rising timing of the input signal Vin.

In brief, upon detecting the rise of the input signal Vin, the signal generation part 31 according to the fourth embodiment generates the first pulse signal (modulated signal MS1) regardless of whether the RF generator 20 is in the ON state or OFF state. The pulse width of the first pulse signal becomes 0.5 to 1.0 time larger than the cycle of the carrier signal CS, depending on the rising timing of the input signal Vin. Upon detecting the rise of an input signal Vin when the carrier signal CS is at "L" level, the signal generation part 31 according to the fourth embodiment generates an internal carrier signal Vcs based on the phase of the delayed carrier signal CS. In contrast, upon detecting the rise of the input signal Vin when the carrier signal CS is at "H" level, the signal generation part 31 according to the fourth embodiment generates an internal carrier signal Vcs based on the inverted phase of the phase of the delayed carrier signal CS.

As discussed above, since the first pulse signal is generated regardless of the state of the RF generator 20, the waveform at the rise of the positive-phase modulated signal MS1 can be stabilized irrespective of whether the input signal Vin and the carrier signal CS are synchronous with each other. In other words, even if the input signal Vin and the carrier signal CS are asynchronous, the modulated signals MS adopted in OOK can be formed to have the similar leading waveform. As a result, the communication device 4 according to the fourth embodiment can stabilize the rise time of the detector circuit, and the signal generation circuit 30 can suppress jittering of output signals in the same manner as in the first and second embodiments.

Furthermore, the second and subsequent pulse signals are generated based on the internal carrier signal Vcs inverted or not inverted in accordance with the rising timing of the input signal Vin. In this manner, the fall of the first pulse signal can be smoothly transitioned to the rise of the second pulse signal, and the second and subsequent pulse signals can be transitioned in a similar manner. In other words, the signal generation part 31 according to the fourth embodiment can stably generate the second and subsequent pulses. As a result, the communication device 4 according to the fourth embodiment can suppress high-frequency pulses such as glitches. The communication device 4 according to the fourth embodiment therefore can further improve the stability of the operation in comparison with the second embodiment.

In the fourth embodiment, the signal generation circuit 30 using a positive-phase modulated signal MS1 and a negative-phase modulated signal MS2 has been described, which is not a limitation. For instance, the signal generation circuit 30 may deal with a single modulated signal MS in the same manner as in the first embodiment. If this is the case, the signal generation part 31 may have a configuration in which the NAND circuit 334 and NOR circuit 338 are omitted from the configuration of FIG. 23. The communication device with such a signal generation circuit 30 can produce the similar effects as the fourth embodiment, and can further improve the stability of the operation in comparison with the first embodiment.

[5] Other Modification Examples

The above embodiments may be combined in any way possible. For instance, the second embodiment may be combined with any of the first to fourth modification examples of the first embodiment. The third embodiment may be combined with any of the first embodiment, the first or second modification example of the first embodiment, the second embodiment, and the modification example of the second embodiment. The fourth embodiment may be combined with the third embodiment or any of the first to third modification examples of the third embodiment. The signal generation circuit 30 according to the fourth embodiment may be applied to each of the number N of channels in the third modification example of the first embodiment. The communication device 1 attained by combining the embodiments and modification examples can produce effects corresponding to the embodiments and/or modification examples in the combination. As described in the third embodiment, the regulation of the phase of each insulation element 40 for suppression of EMI is also applicable to the first and second embodiments. That is, the third embodiment is applicable regardless of the configuration of the signal generation circuit 30, the number of channels in the communication device 1, or the type of insulation elements adopted.

In the specification, the voltage at "H" level denotes a voltage where an N-type transistor having a gate to which this voltage is applied is turned to the ON state, while a P-type transistor having a gate to which the voltage is applied is turned to the OFF state. The voltage at "L" level denotes a voltage where an N-type transistor having a gate to which this voltage is applied is turned to the OFF state, while a P-type transistor having a gate to which the voltage is applied is turned to the ON state. The "first logic level" and "second logic level" correspond to either one of the "H" level and "L" level. The oscillation signal output by the RF generator 20 may be referred to as an "RF signal" or "clock signal". The RF generator 20 may be referred to as an "oscillator". A set of a receiving circuit 50 and an output circuit 60 may be referred to as an "output circuit".

The term "coupling" throughout the specification refers to electrical connection, and therefore it may include coupling by way of other elements. Furthermore, in the specification, the "ON state" denotes a state in which a voltage larger than or equal to the threshold voltage of the transistor is applied to the gate of the corresponding transistor. The "OFF state" denotes a state in which a voltage smaller than the threshold voltage of the transistor is applied to the gate of the corresponding transistor, which may include a state in which a minute current such as a leak current of the transistor is flowing. The "rise of a signal" indicates the voltage of this signal changing from "L" level to "H" level, and the "fall of a signal" indicates the voltage of the signal changing from "H" level to "L" level. The signal being in a "risen state" corresponds to the "H" level, while the signal being in a "fallen state" corresponds to the "L" level. A "pulse signal" corresponds, for example, to a transitioning portion of a signal from "L" level to "H" level to "L" level. A "pulse width" corresponds to a period of the transition of a signal from "L" level to "H" level to "L" level.

Part or all of the above embodiments can be described as in the following additional notes, but are not limited thereto.

<1> A communication device includes an oscillator, a first signal generation circuit, a second signal generation circuit, a first insulation element, a second insulation element, a first output circuit, and a second output circuit. The oscillator outputs a carrier signal when at least one of a first signal and a second signal that are externally input is at a first logic level. The first signal generation circuit includes a first signal generation part and a first drive circuit. The first signal generation part generates a first pulse signal when detecting the rise of the first signal. If the carrier signal is at a second logic level that differs from the first logic level at the detection of the rise of the first signal, the first signal generation part outputs a signal having the same phase as the phase of the carrier signal, as second and subsequent pulse signals. If the carrier signal is at the first logic level at the detection of the rise of the first signal, the first signal generation part outputs a signal having an inverted phase of the phase of the carrier signal, as second and subsequent pulse signals. The first drive circuit amplifies the output signal of the first signal generation part. The second signal generation circuit includes a second signal generation part and a second drive circuit. The second signal generation part generates a first pulse signal when detecting the rise of the second signal. If the carrier signal is at the second logic level at the detection of the rise of the second signal, the second signal generation part outputs a signal having the same phase as the phase of the carrier signal, as second and subsequent pulse signals. If the carrier signal is at the first logic level at the detection of the rise of the first signal, the second signal generation part outputs a signal having an inverted phase of the phase of the carrier signal, as second and subsequent pulse signals. The second drive circuit amplifies the output signal of the second signal generation part. The first insulation element is coupled to the output of the first drive circuit. The second insulation element is coupled to the output of the second drive circuit. The first output circuit receives a signal based on the output signal of the first drive circuit via the first insulation element, and outputs the signal to the outside. The second output circuit receives a signal based on the output signal of the second drive circuit via the second insulation element, and outputs the signal to the outside.

<2> The communication device described in <1> has the configuration as indicated below. The first signal generation part includes a clock transition detection circuit, a pulse generation circuit, a phase detection circuit, a selector circuit, and a first OR circuit. The clock transition detection circuit, to which the first signal and the carrier signal are input, generates a first control signal and a second control signal, based on the input first signal and carrier signal. The pulse generation circuit generates a first input signal based on the first signal, first control signal, and second control signal. The phase detection circuit generates a third control signal and a fourth control signal based on the first control signal and the second control signal. The selector circuit generates an internal carrier signal, based on the third control signal, fourth control signal, and carrier signal. The first OR circuit executes an OR operation upon the first input signal and the internal carrier signal, and the result of the operation is output by the first drive circuit. The clock transition detection circuit transitions the first control signal from the second logic level to the first logic level when detecting the rise of the carrier signal after the rise of the first signal, while the clock transition detection circuit transitions the second control signal from the second logic level to the first logic level when detecting the fall of the carrier signal. The pulse generation circuit transitions the first input signal from the second logic level to the first logic level when detecting the rise of the first signal. The pulse generation circuit transitions the first input signal from the first logic level to the second logic level responsive to both the first control signal and the second control signal turning to the first logic level after the detection of the rise of the first signal. When both the third control signal and the fourth control signal are at the first logic level, if the third control signal is transitioned to the first logic level prior to the fourth control signal, the phase detection circuit generates an internal carrier signal having the same phase as the phase of the carrier signal, while generating an internal carrier signal having an inverted phase of the phase of the carrier signal when the fourth control signal is transitioned to the first logic level prior to the third control signal.

<3> The communication device described in <2> has the configuration as indicated below. The first signal generation part further includes a first delay circuit and a second delay circuit. The first delay circuit provides approximately the same amount of delay as that of the clock transition detection circuit. The second delay circuit provides approximately the same amount of delay as the sum of the amount of delay of the clock transition detection circuit and the amount of delay of the phase detection circuit. The first signal is input to the pulse generation circuit via the first delay circuit, which generates a first input signal based on the delayed first signal. The carrier signal is input to the selector circuit via the second delay circuit, which generates an internal carrier signal based on the delayed carrier signal.

<4> The communication device described in <2> or <3> has the configuration as indicated below. The first signal generation part further includes a first NAND circuit and a first NOR circuit. The first NAND circuit executes a NAND operation upon the first control signal and the second control signal, and outputs the result of the operation as a second input signal. The first NOR circuit executes a NOR operation upon the second input signal and the internal carrier signal, and the result of the operation is output by the first drive circuit. The first drive circuit amplifies the differential of the output of the first OR circuit and the output of the first NOR circuit.

<5> The communication device described in any of <1> to <4> has a configuration as indicated below. When detecting the fall of the first signal after the detection of the rise of the first signal, the first signal generation part outputs the signal of the second logic level to the first drive circuit.

<6> A communication device includes an oscillator, a first signal generation circuit, a second signal generation circuit, a first insulation element, a second insulation element, a first output circuit, and a second output circuit. When at least one of a first signal and a second signal that are externally input is at a first logic level, the oscillator outputs a carrier signal. The first signal generation circuit includes a first delay circuit, a first logic circuit, a second logic circuit, a third logic circuit, and a first drive circuit. The first logic circuit has a first input end to which the first signal is input, and a second input end to which the first signal passed via the first delay circuit is input. The second logic circuit has a first input end to which the output end of the first logic circuit is coupled, and a second input end to which a carrier signal is input. The third logic circuit has a first input end to which the first signal is input, and a second input end to which the output end of the second logic circuit is coupled. The first drive circuit amplifies the voltage output by the third logic circuit. The second signal generation circuit includes a second delay circuit, a fourth logic circuit, a fifth logic circuit, a sixth logic circuit, and a second drive circuit. The fourth logic circuit has a first input end to which the second signal is input, and a second input end to which the second signal passed via the second delay circuit is input. The fifth logic circuit has a first input end to which the output end of the fourth logic circuit is coupled, and a second input end to which the carrier signal is input. The sixth logic circuit has a first input end to which the second signal is input, and a second input end to which the output end of the fifth logic circuit is coupled. The second drive circuit amplifies the voltage output by the sixth logic circuit. The first insulation element is coupled to the output of the first drive circuit. The second insulation element is coupled to the output of the second drive circuit. The first output circuit receives a signal based on the output signal of the first drive circuit via the first insulation element, and outputs the signal to the outside. The second output circuit receives a signal based on the output signal of the second drive circuit via the second insulation element, and outputs the signal to the outside.

<7> In the communication device described in <6>, the first logic circuit, third logic circuit, fourth logic circuit, and sixth logic circuit are AND circuits, while the second logic circuit and fifth logic circuit are NAND circuits.

<8> The communication device described in <6> or <7> has the configuration as indicated below. The first signal generation circuit further includes a fourth inverter and a thirteenth logic circuit. The fourth inverter has an input end to which the output end of the second logic circuit is coupled. The thirteenth logic circuit has a first input end to which the first signal is input, and a second input end to which the output end of the fourth inverter is coupled. The second signal generation circuit further includes a fifth inverter and a fourteenth logic circuit. The second signal generation circuit has an input end to which the output end of the fifth logic circuit is coupled. The fourteenth logic circuit has a first input end to which the second signal is input, and a second input end to which the output end of the fifth inverter is coupled. The first drive circuit amplifies the differential of the output of the third logic circuit and the output of the thirteenth logic circuit. The second drive circuit amplifies the differential of the output of the sixth logic circuit and the output of the fourteenth logic circuit.

<9> The communication device described in any of <1> to <8> has a configuration as indicated below. The first insulation element includes a first coil and a second coil. The first coil is coupled to the output of the first drive circuit. The second coil faces the first coil with an insulation layer interposed, and is coupled to the first output circuit. The second insulation element includes a third coil and a fourth coil. The third coil is coupled to the output of the second drive circuit. The fourth coil faces the third coil with an insulation layer interposed, and is coupled to the second output circuit.

<10> The communication device described in any of <1> to <8> has a configuration as indicated below. The first insulation element includes a first capacitor. The first capacitor has one electrode coupled to the output of the first drive circuit, and the other electrode coupled to the first output circuit. The second insulation element includes a second capacitor. The second capacitor has one electrode coupled to the output of the second drive circuit, and the other electrode coupled to the second output circuit.

<11> The communication device described in any of <1> to <10> further includes a first circuit board and a second circuit board. On the first circuit board, an oscillator, a first signal generation circuit, and a second signal generation circuit are mounted. On the second circuit board, a first output circuit and a second output circuit are mounted. A first insulation element and a second insulation element are mounted on either one of the first circuit board and the second circuit board.

<12> In the communication device described in <1> or <6>, the phase of the carrier signal input to the first signal generation circuit differs from the phase of the carrier signal input to the second signal generation circuit.

<13> In the communication device described in <12>, the oscillator includes a second OR circuit, a second NAND circuit, a first inverter, and a second inverter. The second OR circuit has a first input end to which the first signal is input, and a second input end to which the second signal is input. The second NAND circuit has a first input end to which the output end of the second OR circuit is coupled. The first inverter has an input end to which the output end of the second NAND circuit is coupled. The second inverter has an input end to which the output end of the first inverter is coupled, and an output end to which the second input end of the second NAND circuit is coupled. The output end of the second NAND circuit is coupled to the second signal generation circuit. The output end of the second inverter is coupled to the first signal generation circuit.

<14> In the communication device described in <12>, the oscillator includes a second OR circuit, a second NAND circuit, a first inverter, and a second inverter. The second OR circuit has a first input end to which the first signal is input, and a second input end to which the second signal is input. The second NAND circuit has a first input end to which the output end of the second OR circuit is coupled. The first inverter has an input end to which the output end of the second NAND circuit is coupled. The second inverter has an input end to which the output end of the first inverter is coupled, and an output end to which the second input end of the second NAND circuit is coupled. The output end of the first inverter is coupled to the second signal generation circuit. The output end of the second inverter is coupled to the first signal generation circuit.

<15> The communication device described in <6> further includes a third signal generation circuit, a third insulation element, and a third output circuit. The third signal generation circuit includes a third delay circuit, a seventh logic circuit, an eighth logic circuit, a ninth logic circuit, and a third drive circuit. The seventh logic circuit has a first input end to which a third signal is input from the outside of the communication device, and a second input end to which the third signal passed via a third delay circuit is input. The eighth logic circuit has a first input end to which the output end of the seventh logic circuit is coupled, and a second input end to which the carrier signal is input. The ninth logic circuit has a first input end to which the third signal is input, and a second input end to which the output end of the eighth logic circuit is coupled. The third drive circuit amplifies a voltage output by the ninth logic circuit. The third insulation element is coupled to the output of the third drive circuit. The third output circuit receives a signal based on the output signal of the third drive circuit via the third insulation element, and outputs the signal to the outside.

<16> The communication device described in <15> has the configuration as indicated below. The oscillator outputs carrier signals when at least one of the first signal, second signal, and third signal is at the first logic level. The phase of a carrier signal input to the first signal generation circuit, the phase of a carrier signal input to the second signal generation circuit, and the phase of a carrier signal input to the third signal generation circuit differ from each other.

<17> The communication device described in <16> has the configuration as indicated below. The oscillator includes a second OR circuit, a second NAND circuit, a first inverter, and a second inverter. The second OR circuit includes a first input end to which the first signal is input, a second input end to which the second signal is input, and a third input end to which the third signal is input. The second NAND circuit has a first input end to which the output end of the second OR circuit is coupled. The first inverter has an input end to which the output end of the second NAND circuit is coupled. The second inverter has an input end to which the output end of the first inverter is coupled, and an output end to which the second input end of the second NAND circuit is coupled. The output end of the second NAND circuit is coupled to the third signal generation circuit. The output end of the first inverter is coupled to the second signal generation circuit. The output end of the second inverter is coupled to the first signal generation circuit.

<18> The communication device described in <15> further includes a fourth signal generation circuit, a fourth insulation element, and a fourth output circuit. The fourth signal generation circuit includes a fourth delay circuit, a tenth logic circuit, an eleventh logic circuit, a twelfth logic circuit, and a fourth drive circuit. The tenth logic circuit has a first input end to which a fourth signal is input from the outside of the communication device, and a second input end to which the fourth signal passed via the fourth delay circuit is input. The eleventh logic circuit has a first input end to which the output end of the tenth logic circuit is coupled, and a second input end to which the carrier signal is input. The twelfth logic circuit has a first input end to which the fourth signal is input, and a second input end to which the output end of the eleventh logic circuit is coupled. The fourth drive circuit amplifies a voltage output by the twelfth logic circuit. The fourth insulation element is coupled to the output of the fourth drive circuit. The fourth output circuit receives a signal based on the output signal of the fourth drive circuit via the fourth insulation element, and outputs the signal to the outside.

<19> The communication device described in <18> has the configuration as indicated below. The oscillator outputs a carrier signal when at least one of the first signal, second signal, third signal, and fourth signal is at the first logic level. The phase of the carrier signal input to the first signal generation circuit, the phase of the carrier signal input to the second signal generation circuit, the phase of the carrier signal input to the third signal generation circuit, and the phase of the carrier signal input to the fourth signal generation circuit differ from each other.

<20> The communication device described in <19> has the configuration as indicated below. The oscillator includes a second OR circuit, a second NAND circuit, a first inverter, a second inverter, and a third inverter. The second OR circuit has a first input end to which the first signal is input, a second input end to which the second signal is input, a third input end to which the third signal is input, and a fourth input end to which the fourth signal is input. The second NAND circuit has a first input end to which the output end of the second OR circuit is coupled. The first inverter has an input end to which the output end of the second NAND circuit is coupled. The second inverter has an input end to which the output end of the first inverter is coupled, and an output end to which the second input end of the second NAND circuit is coupled. The third inverter has an input end to which the output end of the second inverter is coupled. The output end of the second NAND circuit is coupled to the fourth signal generation circuit. The output end of the first inverter is coupled to the second signal generation circuit. The output end of the second inverter is coupled to the first signal generation circuit. The output end of the third inverter is coupled to the third signal generation circuit.

<21> The communication device includes an oscillator, an Nth signal generation circuit, an Nth insulation element, an Nth receiving circuit, and an Nth output circuit. The oscillator outputs a carrier signal when at least one of a first signal and a second signal that are externally input is at a first logic level. The Nth signal generation circuit generates a first pulse signal when detecting an Nth signal (where N is an integer greater than or equal to 1) at the first logic level among a plurality of signals, and outputs a pulse signal in which pulse signals following the first pulse signal are based on the carrier signals, which are stopped when the Nth signal is at the second logic level. An Nth drive circuit amplifies the output signal of the Nth signal generation part. The Nth insulation element is coupled to the output of the Nth drive circuit. The Nth receiving circuit receives a signal based on the output signal of the Nth drive circuit via the Nth insulation element, and demodulates the signal from the received signal. The Nth output circuit outputs the signal based on the output signal of the Nth receiving circuit to the outside.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A communication device comprising:
an oscillator configured to output a first carrier signal when at least one of a plurality of input signals that are externally input is at a first logic level;

a first signal generation circuit to which the first carrier signal and a first input signal among the input signals are input, wherein the first signal generation circuit is configured to
  generate a first signal when the first input signal changes from a second logic level to the first logic level, output a first modulated signal based on the first signal, and thereafter output a second modulated signal based on the first carrier signal, and
  output a second logic level signal when the first input signal changes from the first logic level to the second logic level;
a first insulation element coupled to an output of the first signal generation circuit;
a first receiving circuit configured to perform signal reception via the first insulation element and signal demodulation, based on the output of the first signal generation circuit; and
a first output circuit configured to externally output the signal demodulated by the first receiving circuit.

2. The device of claim 1, wherein
the first signal is a single pulse signal.

3. The device of claim 1, wherein
the first modulated signal is continuous to the second modulated signal.

4. The device of claim 1, wherein
the first signal generation circuit outputs a differential signal.

5. The device of claim 1, further comprising:
a second signal generation circuit to which a second input signal among the input signals and a second carrier signal output by the oscillator are input, wherein the second signal generation circuit is configured to
  generate a second signal when the second input signal changes from the second logic level to the first logic level, output a third modulated signal based on the second signal, and thereafter output a fourth modulated signal based on the second carrier signal;
  output a second logic level signal when the second input signal changes from the first logic level to the second logic level;
a second insulation element coupled to an output of the second signal generation circuit;
a second receiving circuit configured to perform signal reception via the second insulation element and signal demodulation, based on the output of the second signal generation circuit; and
a second output circuit configured to externally output the signal demodulated by the second receiving circuit.

6. The device of claim 5, wherein
the first carrier signal and the second carrier signal each have a different phase.

7. The device of claim 1, wherein
upon detection of a change of the first input signal from the second logic level to the first logic level when the first carrier signal that is being output by the oscillator is at the second logic level, the first signal generation circuit outputs the first modulated signal, and thereafter outputs the second modulated signal in phase with the first carrier signal.

8. The device of claim 1, wherein
upon detection of a change of the first input signal from the second logic level to the first logic level when the first carrier signal that being output by the oscillator is at the first logic level, the first signal generation circuit outputs the first modulated signal, and thereafter outputs the second modulated signal by inverting a phase of the second modulated signal.

9. The device of claim 1, wherein
the first signal generation circuit generates the first signal based on a delayed signal generated by delaying the first input signal.

10. A communication device comprising:
an oscillator configured to output a carrier signal when at least one of an externally input first input signal and second input signal is at a first logic level;
a first signal generation circuit comprising a first signal generation unit and a first drive circuit, wherein the first signal generation unit is configured to generate a first pulse when detecting a rising edge of the first input signal, output a signal based on and in phase with the carrier signal as a signal including a second and subsequent pulses if the carrier signal is at a second logic level, which differs from the first logic level, at time of detecting the rising edge of the first input signal, and output a signal based on the carrier signal and having a phase inverted from a phase of the carrier signal as a signal including a second and subsequent pulses if the carrier signal is at the first logic level at the time of detecting the rising edge of the first input signal, and the first drive circuit is configured to amplify an output signal of the first signal generation unit;
a second signal generation circuit comprising a second signal generation unit and a second drive circuit, wherein the second signal generation unit is configured to generate a second pulse when detecting a rising edge of the second input signal, output a signal based on and in phase with the carrier signal as a signal including a second and subsequent pulses if the carrier signal is at the second logic level at time of detecting the rising edge of the second input signal, and output a signal based on the carrier signal and having a phase inverted from the phase of the carrier signal as a signal including a second and subsequent pulses if the carrier signal is at the first logic level at the time of detecting the rising edge of the second input signal, and a second drive circuit is configured to amplify an output signal of the second signal generation unit;
a first insulation element coupled to an output of the first drive circuit;
a second insulation element coupled to an output of the second drive circuit;
a first output circuit configured to receive a signal based on the output signal of the first drive circuit via the first insulation element and externally output a signal based on the received signal; and
a second output circuit configured to receive a signal based on the output signal of the second drive circuit via the second insulation element and externally output a signal based on the received signal.

11. The device of claim 10, wherein
the first signal generation unit comprises:
  a clock transition detection circuit to which the first input signal and the carrier signal are input, the clock transition detection circuit being configured to generate a first control signal and a second control signal based on the input first input signal and carrier signal;
  a pulse generation circuit configured to generate a first signal based on the first delayed input signal, the first control signal and the second control signal;

a phase detection circuit configured to generate a third control signal and a fourth control signal based on the first control signal and the second control signal;

a selector circuit configured to generate an internal carrier signal based on the third control signal, the fourth control signal and a second delayed carrier signal; and a first OR circuit configured to execute an OR operation upon the first signal and the internal carrier signal, wherein a result of the OR operation is amplified and output by the first drive circuit, the clock transition detection circuit is configured to transition the first control signal from the second logic level to the first logic level when detecting a rising edge of the carrier signal after the first input signal rises, and to transition the second control signal from the second logic level to the first logic level when detecting a falling edge of the carrier signal, the pulse generation circuit is configured to transition the first signal from the second logic level to the first logic level when detecting the rising edge of the first input signal, and to transition the first signal from the first logic level to the second logic level in response to the first control signal and the second control signal both transitioned to the first logic level after detecting the rising edge of the first input signal, the phase detection circuit is configured to, when the first control signal and the second control signal are both transitioned to the first logic level, transition the third control signal from the second logic level to the first logic level if the first control signal is transitioned to the first logic level prior to the second control signal, and transition the fourth control signal from the second logic level to the first logic level if the second control signal is transitioned to the first logic level prior to the first control signal, and the selector circuit is configured to generate a signal based on and in phase with the carrier signal as the internal carrier signal when the third control signal is at the first logic level, and generate a signal based on the carrier signal and having a phase inverted from the phase of the carrier signal as the internal carrier signal when the fourth control signal is at the first logic level.

12. The device of claim 11, wherein the first signal generation unit further comprises:
  a first delay circuit configured to provide a same amount of delay as an amount of delay of the clock transition detection circuit;
  a second delay circuit configured to provide a same amount of delay as a sum of the amount of delay of the clock transition detection circuit and an amount of delay of the phase detection circuit, the first input signal is inputted to the pulse generation circuit via the first delay circuit, and the pulse generation circuit is configured to generate the first signal based on the delayed first input signal, and the carrier signal is inputted to the selector circuit via the second delay circuit, and the selector circuit is configured to generate the internal carrier signal based on the delayed carrier signal.

13. The device of claim 11, wherein the first signal generation unit further comprises:
  a first NAND circuit configured to execute a NAND operation upon the first control signal and the second control signal and output an operation result as a second signal; and a first NOR circuit configured to execute a NOR operation upon the second signal and the internal carrier signal, wherein a result of the NOR operation is amplified and output by the first drive circuit, the first drive circuit is configured to amplify a differential of an output of the first OR circuit and an output of the first NOR circuit.

14. The device of claim 10, wherein the first signal generation unit is configured to output a signal of the second logic level to the first drive circuit when detecting a falling edge of the first input signal after detecting the rising edge of the first input signal.

15. A communication device comprising:

an oscillator configured to output a first carrier signal and a second carrier signal when at least one of an externally input first input signal and second input signal is at a first logic level;

a first signal generation circuit comprising a first delay circuit, a first logic circuit, a second logic circuit, a third logic circuit, and a first drive circuit, wherein the first logic circuit has a first input end to which the first input signal is input and a second input end to which the first input signal is input via the first delay circuit, the second logic circuit has a first input end coupled to an output end of the first logic circuit and a second input end to which the first carrier signal is input, the third logic circuit has a first input end to which the first input signal is input and a second input end coupled to an output end of the second logic circuit, and the first drive circuit is configured to amplify a voltage output by the third logic circuit;

a second signal generation circuit comprising a second delay circuit, a fourth logic circuit, a fifth logic circuit, a sixth logic circuit, and a second drive circuit, wherein the fourth logic circuit has a first input end to which the second input signal is input and a second input end to which the second input signal is input via the second delay circuit, the fifth logic circuit has a first input end coupled to the output end of the fourth logic circuit and a second input end to which the second carrier signal is input, the sixth logic circuit has a first input end to which the second input signal is input and a second input end coupled to an output end of the fifth logic circuit, and the second drive circuit is configured to amplify a voltage output by the sixth logic circuit;

a first insulation element coupled to an output of the first drive circuit;

a second insulation element coupled to an output of the second drive circuit;

a first output circuit configured to receive a signal based on the output signal of the first drive circuit via the first insulation element and externally output a signal based on the received signal; and a second output circuit configured to receive a signal based on the output signal of the second drive circuit via the second insulation element and externally output a signal based on the received signal.

16. The device of claim 15, wherein the first logic circuit, the third logic circuit, the fourth logic circuit, and the sixth logic circuit are AND circuits, and the second logic circuit and the fifth logic circuit are NAND circuits.

17. The device of claim 15, wherein the first signal generation circuit further comprises a first inverter having an input end coupled to the output end of the second logic circuit, and a seventh logic circuit having a first input end to which the first input signal is input and a second input end coupled to an output end of the first inverter, the second signal generation circuit further comprises a second inverter having an input end coupled to the output end of the fifth logic circuit and an eighth logic circuit having a first input end to which the second input signal is input and a second input end coupled to an output end of the second inverter, the first drive circuit is configured to amplify a differential of an output of the third logic circuit and an output of the seventh logic circuit, and the second drive circuit is configured to amplify a differential of an output of the sixth logic circuit and an output of the eighth logic circuit.

18. The device of claim 15, wherein the first insulation element comprises a first coil coupled to the output of the first drive circuit and a second coil coupled to the first output circuit and facing the first coil with an insulation layer interposed, and the second insulation element comprises a third coil coupled to the output of the second drive circuit and a fourth coil coupled to the second output circuit and facing the third coil with an insulation layer interposed.

19. The device of claim 15, wherein the first insulation element comprises a first capacitor having one electrode coupled to the output of the first drive circuit and another electrode coupled to the first output circuit, and the second insulation element comprises a second capacitor having one electrode coupled to the output of the second drive circuit and another electrode coupled to the second output circuit.

20. The device of claim 15, wherein the first carrier signal has a phase that differs from a phase of the second carrier signal.

* * * * *